US012694162B2

(12) United States Patent
Del Rio Nava et al.

(10) Patent No.: US 12,694,162 B2
(45) Date of Patent: Jul. 28, 2026

(54) SECURITY OF PHYSICAL ACCOUNT CARDS

(71) Applicant: Apple Inc., Cupertino, CA (US)

(72) Inventors: Josue N. Del Rio Nava, San Jose, CA (US); Murthy V. Vedula, Morgan Hill, CA (US); Gabe B. Gindele, Santa Clara, CA (US); Christopher W. Dulgarian, Folsom, CA (US); Khalil Dababneh, Campbell, CA (US); Philippe M. Wilson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/537,989

(22) Filed: Feb. 12, 2026

(65) Prior Publication Data

US 2026/0178785 A1 Jun. 25, 2026

Related U.S. Application Data

(63) Continuation of application No. 19/070,379, filed on Mar. 4, 2025.

(60) Provisional application No. 63/657,065, filed on Jun. 6, 2024, provisional application No. 63/573,701, filed on Apr. 3, 2024, provisional application No. 63/561,667, filed on Mar. 5, 2024.

(51) Int. Cl.
*G06F 21/86* (2013.01)
*G06F 21/34* (2013.01)

(52) U.S. Cl.
CPC .............. *G06F 21/86* (2013.01); *G06F 21/34* (2013.01)

(58) Field of Classification Search
CPC ................................. G06F 21/86; G06F 21/34
See application file for complete search history.

(56) References Cited

U.S. PATENT DOCUMENTS

| | | | |
|---|---|---|---|
| 7,404,516 B2 | 7/2008 | McGee et al. | |
| 8,827,153 B1 | 9/2014 | Rhoades et al. | |
| 8,939,354 B1 | 1/2015 | Hinson et al. | |
| 9,767,329 B2 * | 9/2017 | Forster | H04W 12/122 |
| 10,032,100 B2 | 7/2018 | Mullen et al. | |
| 10,127,409 B1 * | 11/2018 | Wade | G06F 21/75 |
| 10,223,631 B2 | 3/2019 | Mullen et al. | |
| 10,255,545 B2 | 4/2019 | Mullen et al. | |

(Continued)

FOREIGN PATENT DOCUMENTS

| | | |
|---|---|---|
| CN | 106355418 A | 1/2017 |
| CN | 106408314 A | 2/2017 |

(Continued)

OTHER PUBLICATIONS

Gototags Store, "Tamper Loop NFC Sticker—NTAG213 TT—25 mm Circle", retrieved from internet on Mar. 5, 2024: https://store. gototags.com/tamper-loop-nfc-sticker-ntag213-tt-25-mm-circle/, 2024, 6 pages.

(Continued)

*Primary Examiner* — Mohammad A Siddiqi
(74) *Attorney, Agent, or Firm* — YHE Law LLP

(57) ABSTRACT

The present disclosure generally relates to managing the security of physical account cards. In some examples, resources are securely associated with a physical account card. In some examples, resources that are associated with the physical account card are securely accessed or transferred.

36 Claims, 22 Drawing Sheets

(56) References Cited

U.S. PATENT DOCUMENTS

| 10,276,070 | B2 | | 4/2019 | Pascua et al. | |
|---|---|---|---|---|---|
| 10,373,040 | B2 | | 8/2019 | Tomczyk | |
| 10,650,203 | B1 | * | 5/2020 | Yamamoto | G06K 7/10366 |
| 10,725,077 | B2 | * | 7/2020 | Verhoeven | G06K 19/0716 |
| 10,963,767 | B2 | | 3/2021 | Pascua et al. | |
| 11,030,508 | B2 | * | 6/2021 | Dehmubed | G06K 19/07722 |
| 11,089,916 | B2 | * | 8/2021 | Reynolds | A47K 7/03 |
| 11,907,780 | B2 | | 2/2024 | Yee et al. | |
| 2005/0044403 | A1 | * | 2/2005 | Kim | H10W 42/40 |
| | | | | | 726/26 |
| 2007/0246527 | A1 | | 10/2007 | Tang | |
| 2009/0107862 | A1 | | 4/2009 | Pascua et al. | |
| 2010/0102966 | A1 | | 4/2010 | Skowronek et al. | |
| 2016/0012445 | A1 | * | 1/2016 | Villa-Real | G06Q 20/4016 |
| | | | | | 705/44 |
| 2018/0240371 | A1 | * | 8/2018 | Schwar | G09F 3/0376 |
| 2019/0357648 | A1 | | 11/2019 | Kinney et al. | |
| 2020/0034825 | A1 | | 1/2020 | Levy et al. | |
| 2020/0089861 | A1 | | 3/2020 | Stryker | |
| 2021/0142631 | A1 | | 5/2021 | Bella et al. | |
| 2021/0216958 | A1 | | 7/2021 | Pacheco et al. | |
| 2022/0415112 | A1 | | 12/2022 | Weisbecker et al. | |
| 2025/0284853 | A1 | * | 9/2025 | Del Rio Nava | G06F 21/86 |

FOREIGN PATENT DOCUMENTS

| GB | 2446178 | A | 8/2008 |
|---|---|---|---|
| WO | 2007/024786 | A1 | 3/2007 |

OTHER PUBLICATIONS

Great Creativity, "Disposable Tamper Proof Anti-Theft NFC Tag Custom Wholesale", Great Creativity, Retrieved from the url <https://www.nfotagfactory.com/products/disposable-tamper-proof-anti-theft-NFC-tag.html> on Apr. 7, 2026, 6 pages.

International Preliminary Report on Patentability received for PCT Patent Application No. PCT/US2025/018546, mailed on Oct. 14, 2025, 7 pages.

International Search Report and Written Opinion received for PCT Patent Application No. PCT/US2025/018546, mailed on May 22, 2025, 11 pages.

RFID Label, "Tamper-Evident NFC labels: What They Are, How They Work, and Their Top 5 Applications", RFID Label, Retrieved from the url <https://www.rfidlabel.com/tamper-evident-nfc-labels-what-they-are-how-they-work-and-their-top-5-applications/> on Apr. 7, 2026, 10 pages.

Seritag NFC Tags, "NFC Tamper Tags—A 90 Second Product Intro", Online Available at: https://www.youtube.com/watch?v=e7WizGGRdvY, Mar. 6, 2023, 3 pages.

Written Opinion received for PCT Patent Application No. PCT/US2025/018546, mailed on Jul. 25, 2025, 6 pages.

* cited by examiner

Portable Multifunction Device 100

210          212

Speaker 111    Optical Sensor 164    Proximity Sensor 166

208    200    206

210 is SIM card slot
212 is headphone jack

208

202

Touch Screen 112

Contact Intensity
Sensor(s) 165

Tactile Output
Generator(s) 167

203

Microphone 113    Home 204    Accelerometer(s) 168

External Port 124

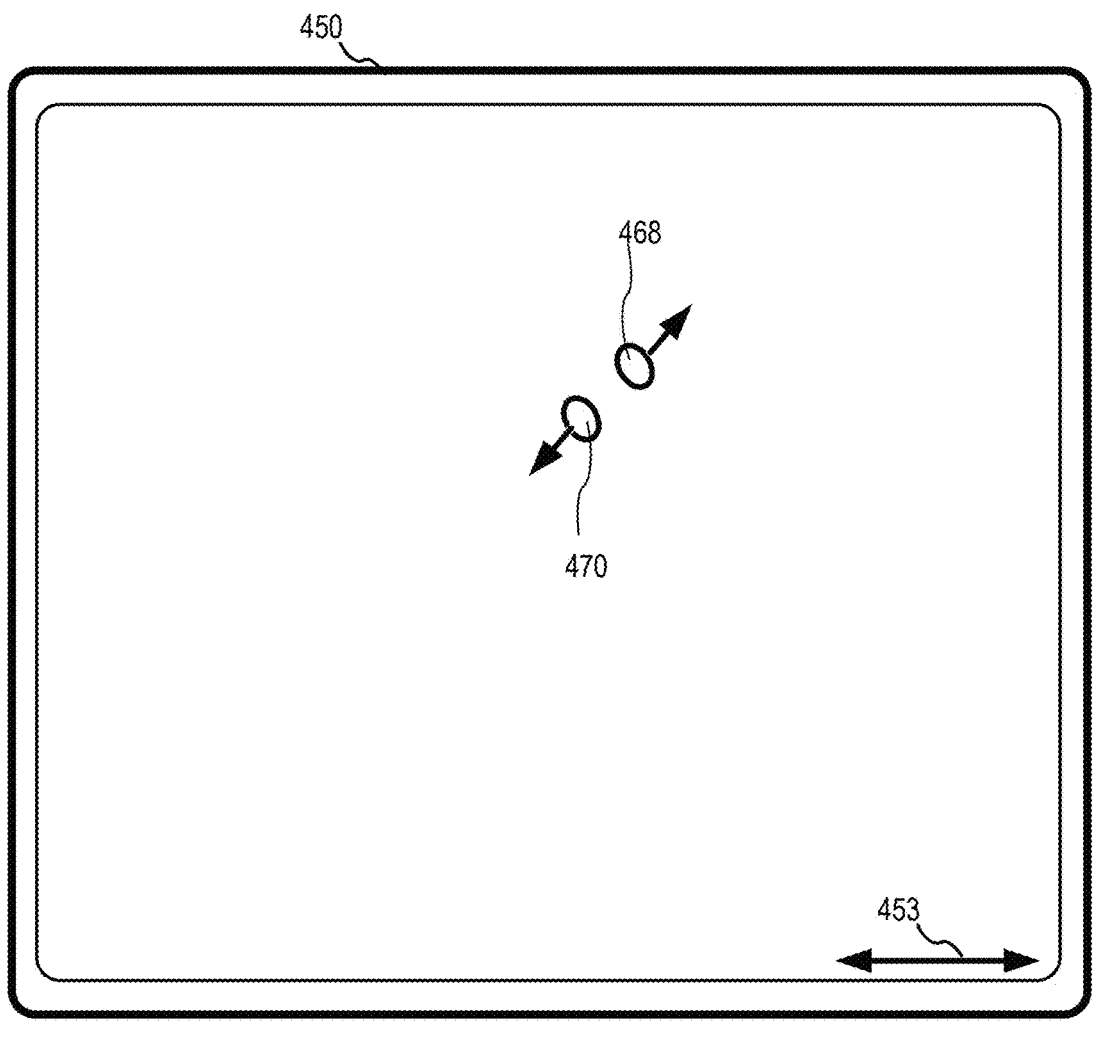
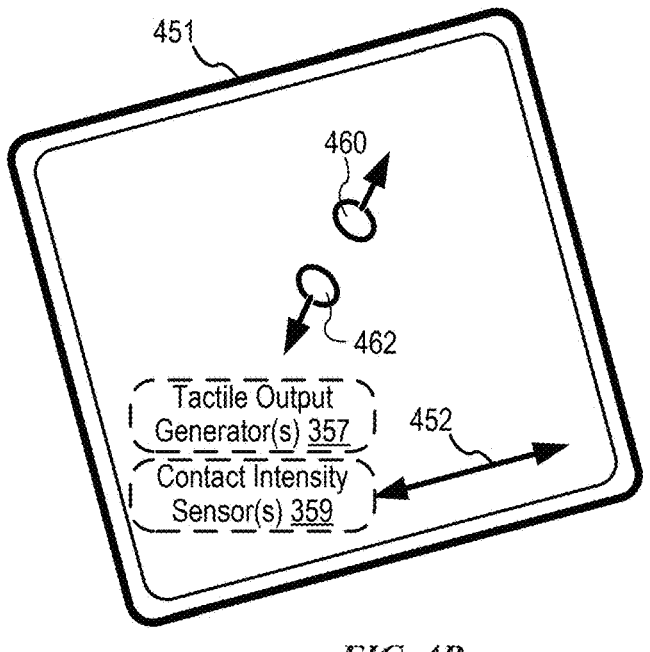
*FIG. 4B*

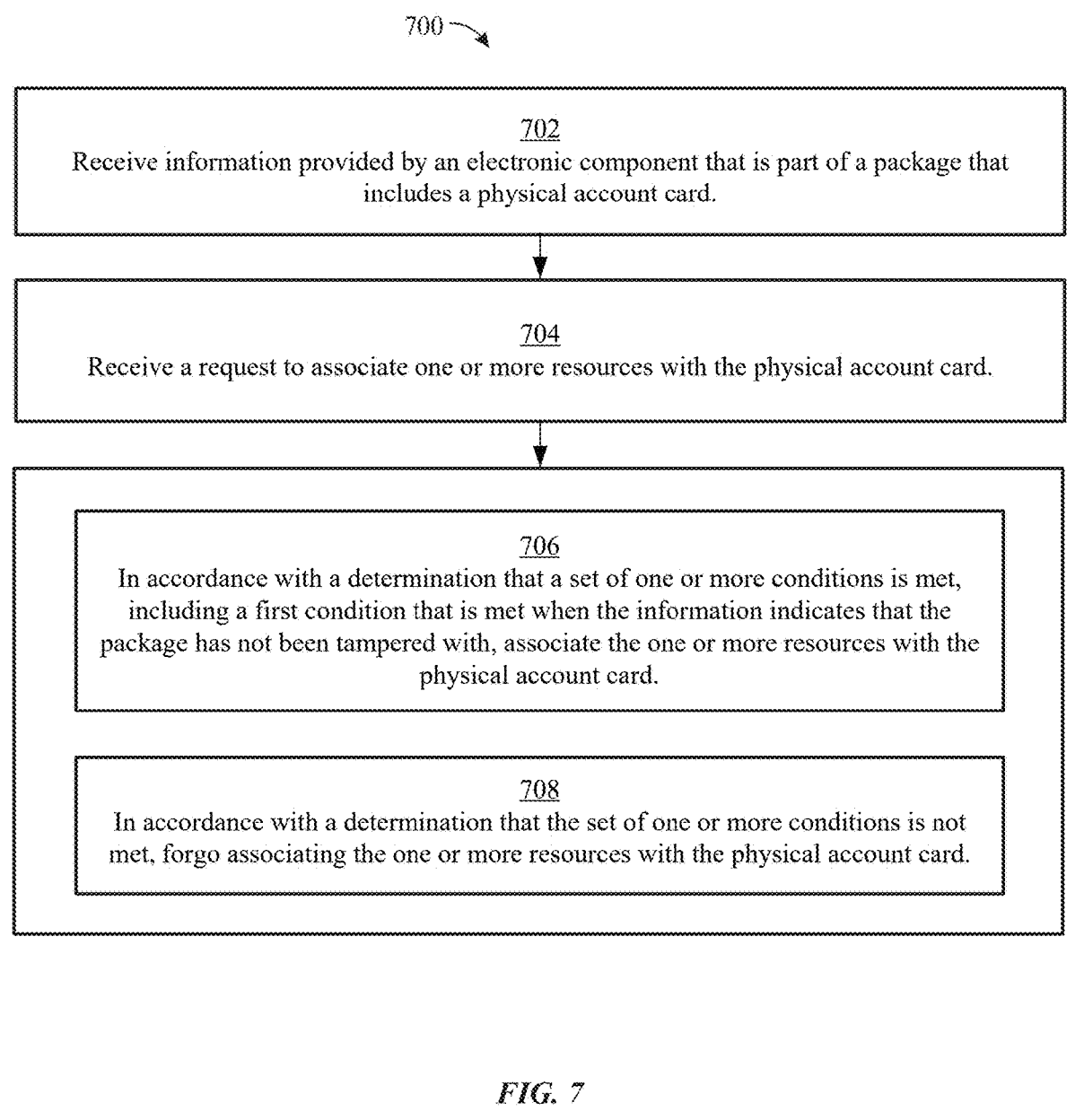

700 ⇘

702
Receive information provided by an electronic component that is part of a package that includes a physical account card.

↓

704
Receive a request to associate one or more resources with the physical account card.

↓

706
In accordance with a determination that a set of one or more conditions is met, including a first condition that is met when the information indicates that the package has not been tampered with, associate the one or more resources with the physical account card.

708
In accordance with a determination that the set of one or more conditions is not met, forgo associating the one or more resources with the physical account card.

*FIG. 7*

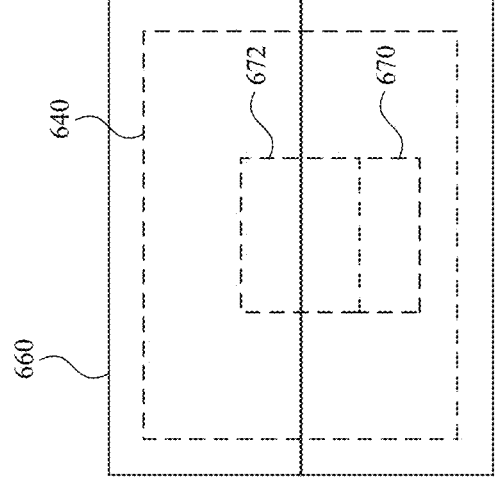
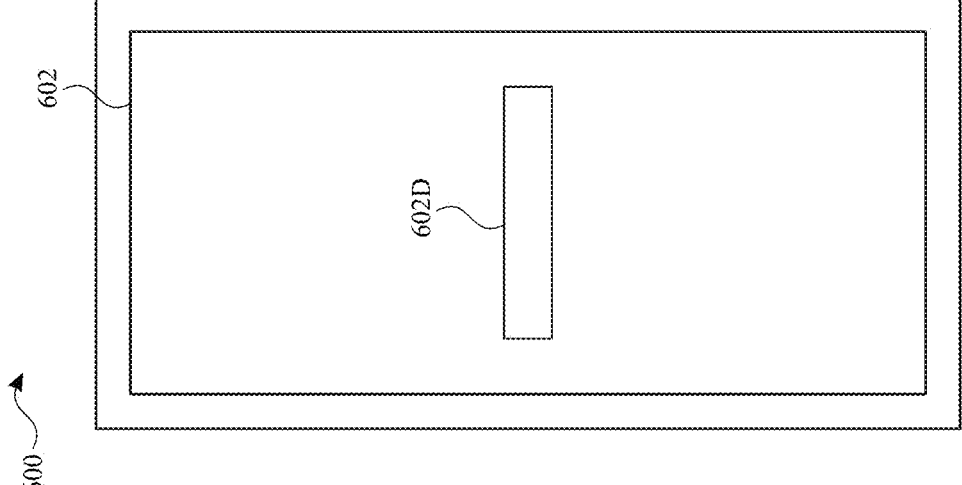
*FIG. 8A*

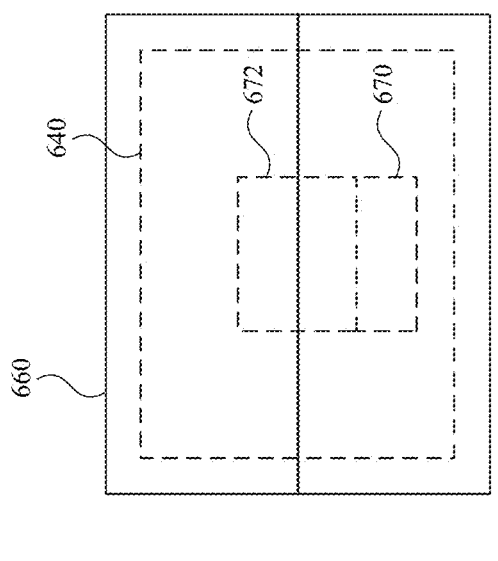
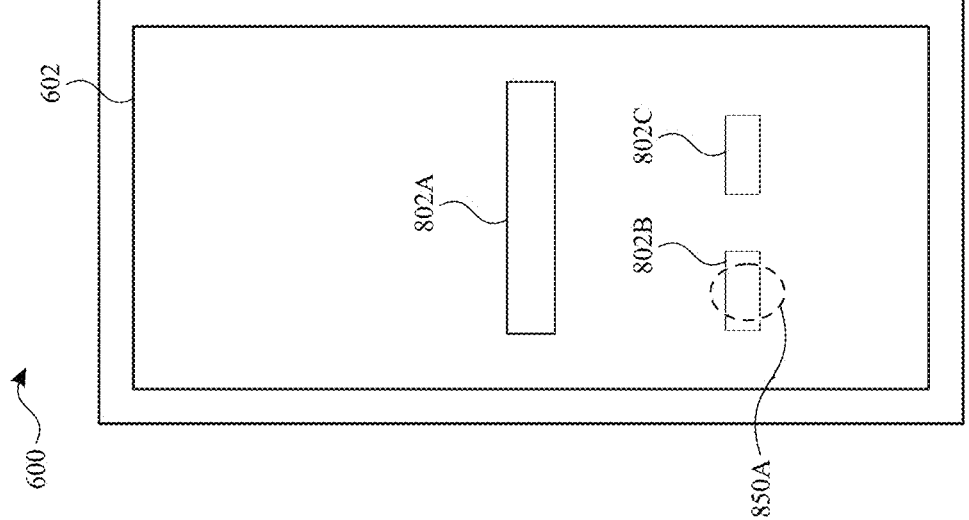
*FIG. 8B*

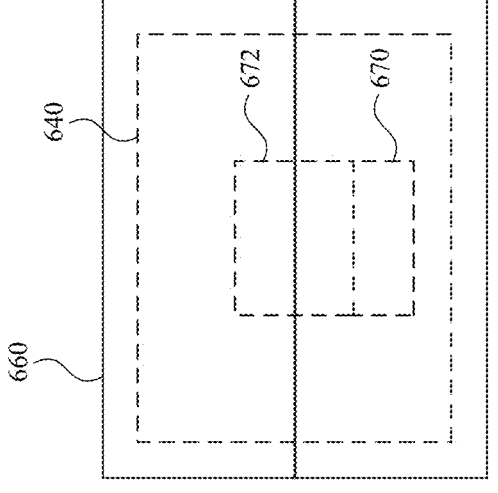
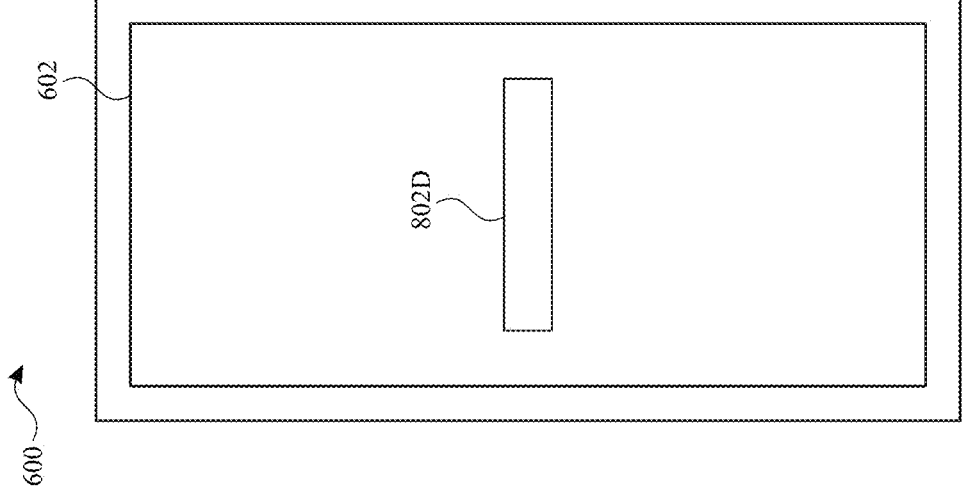
*FIG. 8C*

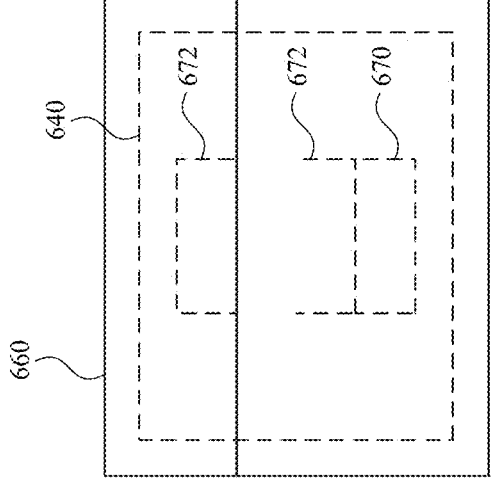
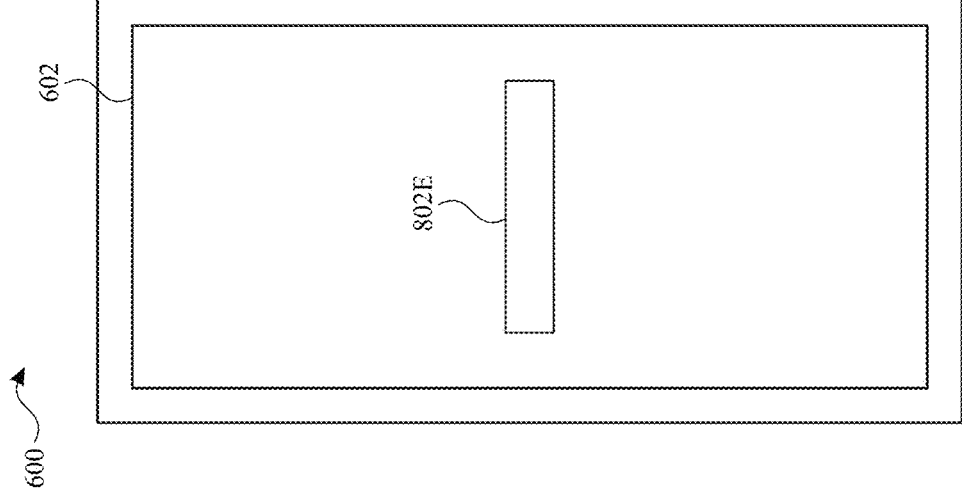
FIG. 8D

900

<table>
<tr><td>

902
Receive, via the short-range communication radio, information from an electronic component that is part of a package that includes a physical account card, wherein one or more resources are associated with the physical account card.

</td></tr>
</table>

904
While logged into an account of a service, transmit to an external device, via the communication interface that is different from the short-range communication radio:

> 906
> A request to associate the one or more resources with the account of the service.

> 908
> The information received from the electronic component.

910
Subsequent to transmitting the request to associate the one or more resources associated with the physical account card with the account, receive a response, wherein the response includes an indication, determined using the information received from the electronic component, of whether the package has been tampered with.

912
In accordance with a determination that the response indicates that the package has not been tampered with, display, via the display generation component, a first indication.

914
In accordance with a determination that the response indicates that the package has been tampered with, display, via the display generation component, a second indication that is different from the first indication.

*FIG. 9*

SECURITY OF PHYSICAL ACCOUNT CARDS

CROSS-REFERENCE TO RELATED APPLICATIONS

This application is a continuation of U.S. patent application Ser. No. 19/070,379, entitled "SECURITY OF PHYSICAL ACCOUNT CARDS," filed on Mar. 4, 2025, which claims the benefit of U.S. Provisional Patent Application No. 63/657,065, entitled "SECURITY OF PHYSICAL ACCOUNT CARDS," filed on Jun. 6, 2024, and claims priority to U.S. Provisional Patent Application No. 63/573,701, entitled "SECURITY OF PHYSICAL ACCOUNT CARDS," filed on Apr. 3, 2024, and claims priority to U.S. Provisional Patent Application No. 63/561,667, entitled "SECURITY OF PHYSICAL ACCOUNT CARDS," filed on Mar. 5, 2024. The contents of each of which are hereby incorporated by reference in their entirety.

FIELD

The present disclosure relates generally to device security, and more specifically to techniques for managing the security of physical account cards.

BACKGROUND

Short-range communication technologies enable physical account cards, such as employee badges, to communicate with computer systems to provides users with secure access to resources. For example, RFID and NFC cards provide users with secure building access when the cards are read by a card reader and authenticated.

BRIEF SUMMARY

Some techniques for managing the security of physical account cards, however, do not consider whether the physical account card has been tampered with or otherwise improperly accessed. Some techniques for managing the security of physical account cards using electronic devices are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient, and more secure methods and interfaces for managing the security of physical account cards. Such methods and interfaces optionally complement or replace other methods for managing the security of physical account cards. Such methods and interfaces provide additional security for resources to be assigned or previously assigned to a physical account card. Such methods and interfaces reduce the cognitive burden on a user and produce a more efficient human-machine interface. For battery-operated computing devices, such methods and interfaces conserve power and increase the time between battery charges.

In some embodiments, a method is disclosed. The method comprises: at a computer system: receiving information provided by an electronic component that is part of a package that includes a physical account card; receiving a request to associate one or more resources with the physical account card; in accordance with a determination that a set of one or more conditions is met, including a first condition that is met when the information indicates that the package has not been tampered with, associating the one or more resources with the physical account card; and in accordance with a determination that the set of one or more conditions is not met, forgoing associating the one or more resources with the physical account card.

In some embodiments, a non-transitory computer-readable storage medium is disclosed. The non-transitory computer-readable storage medium stores one or more programs configured to be executed by one or more processors of a computer system. The one or more programs including instructions for: receiving information provided by an electronic component that is part of a package that includes a physical account card; receiving a request to associate one or more resources with the physical account card; in accordance with a determination that a set of one or more conditions is met, including a first condition that is met when the information indicates that the package has not been tampered with, associating the one or more resources with the physical account card; and in accordance with a determination that the set of one or more conditions is not met, forgoing associating the one or more resources with the physical account card.

In some embodiments, a transitory computer-readable storage medium is disclosed. The transitory computer-readable storage medium stores one or more programs configured to be executed by one or more processors of a computer system. The one or more programs including instructions for: receiving information provided by an electronic component that is part of a package that includes a physical account card; receiving a request to associate one or more resources with the physical account card; in accordance with a determination that a set of one or more conditions is met, including a first condition that is met when the information indicates that the package has not been tampered with, associating the one or more resources with the physical account card; and in accordance with a determination that the set of one or more conditions is not met, forgoing associating the one or more resources with the physical account card.

In some embodiments, a computer system is disclosed. The computer system comprises: one or more processors; and memory storing one or more programs configured to be executed by the one or more processors, the one or more programs including instructions for: receiving information provided by an electronic component that is part of a package that includes a physical account card; receiving a request to associate one or more resources with the physical account card; in accordance with a determination that a set of one or more conditions is met, including a first condition that is met when the information indicates that the package has not been tampered with, associating the one or more resources with the physical account card; and in accordance with a determination that the set of one or more conditions is not met, forgoing associating the one or more resources with the physical account card.

In some embodiments, a computer system is disclosed. The computer system comprises: means for receiving information provided by an electronic component that is part of a package that includes a physical account card; means for receiving a request to associate one or more resources with the physical account card; means, in accordance with a determination that a set of one or more conditions is met, including a first condition that is met when the information indicates that the package has not been tampered with, for associating the one or more resources with the physical account card; and means, in accordance with a determination that the set of one or more conditions is not met, for forgoing associating the one or more resources with the physical account card.

In some embodiments, a computer program product is disclosed. The computer program product comprises one or more programs configured to be executed by one or more processors of a computer system, the one or more programs including instructions for: receiving information provided by an electronic component that is part of a package that includes a physical account card; receiving a request to associate one or more resources with the physical account card; in accordance with a determination that a set of one or more conditions is met, including a first condition that is met when the information indicates that the package has not been tampered with, associating the one or more resources with the physical account card; and in accordance with a determination that the set of one or more conditions is not met, forgoing associating the one or more resources with the physical account card.

In some embodiments, a method is disclosed. The method comprises: at a computer system that is in communication with a display generation component, a short-range communication radio, and a communication interface that is different from the short-range communication radio: receiving, via the short-range communication radio, information from an electronic component that is part of a package that includes a physical account card, wherein one or more resources are associated with the physical account card; while logged into an account of a service, transmitting to an external device, via the communication interface that is different from the short-range communication radio: a request to associate the one or more resources with the account of the service; and the information received from the electronic component; subsequent to transmitting the request to associate the one or more resources associated with the physical account card with the account, receiving a response, wherein the response includes an indication, determined using the information received from the electronic component, of whether the package has been tampered with; in accordance with a determination that the response indicates that the package has not been tampered with, displaying, via the display generation component, a first indication; and in accordance with a determination that the response indicates that the package has been tampered with, displaying, via the display generation component, a second indication that is different from the first indication.

In some embodiments, a non-transitory computer-readable storage medium is disclosed. The non-transitory computer-readable storage medium stores one or more programs configured to be executed by one or more processors of a computer system that is in communication with a display generation component, a short-range communication radio, and a communication interface that is different from the short-range communication radio, the one or more programs including instructions for: receiving, via the short-range communication radio, information from an electronic component that is part of a package that includes a physical account card, wherein one or more resources are associated with the physical account card; while logged into an account of a service, transmitting to an external device, via the communication interface that is different from the short-range communication radio: a request to associate the one or more resources with the account of the service; and the information received from the electronic component; subsequent to transmitting the request to associate the one or more resources associated with the physical account card with the account, receiving a response, wherein the response includes an indication, determined using the information received from the electronic component, of whether the package has been tampered with; in accordance with a determination that the response indicates that the package has not been tampered with, displaying, via the display generation component, a first indication; and in accordance with a determination that the response indicates that the package has been tampered with, displaying, via the display generation component, a second indication that is different from the first indication.

In some embodiments, a transitory computer-readable storage medium is disclosed. The transitory computer-readable storage medium stores one or more programs configured to be executed by one or more processors of a computer system that is in communication with a display generation component, a short-range communication radio, and a communication interface that is different from the short-range communication radio, the one or more programs including instructions for: receiving, via the short-range communication radio, information from an electronic component that is part of a package that includes a physical account card, wherein one or more resources are associated with the physical account card; while logged into an account of a service, transmitting to an external device, via the communication interface that is different from the short-range communication radio: a request to associate the one or more resources with the account of the service; and the information received from the electronic component; subsequent to transmitting the request to associate the one or more resources associated with the physical account card with the account, receiving a response, wherein the response includes an indication, determined using the information received from the electronic component, of whether the package has been tampered with; in accordance with a determination that the response indicates that the package has not been tampered with, displaying, via the display generation component, a first indication; and in accordance with a determination that the response indicates that the package has been tampered with, displaying, via the display generation component, a second indication that is different from the first indication.

In some embodiments, a computer system is disclosed. The computer system is configured to communicate with a display generation component, a short-range communication radio, and a communication interface that is different from the short-range communication radio, and comprises: one or more processors; and memory storing one or more programs configured to be executed by the one or more processors, the one or more programs including instructions for: receiving, via the short-range communication radio, information from an electronic component that is part of a package that includes a physical account card, wherein one or more resources are associated with the physical account card; while logged into an account of a service, transmitting to an external device, via the communication interface that is different from the short-range communication radio: a request to associate the one or more resources with the account of the service; and the information received from the electronic component; subsequent to transmitting the request to associate the one or more resources associated with the physical account card with the account, receiving a response, wherein the response includes an indication, determined using the information received from the electronic component, of whether the package has been tampered with; in accordance with a determination that the response indicates that the package has not been tampered with, display-ing, via the display generation component, a first indication; and in accordance with a determination that the response indicates that the package has been tampered with, display-ing, via the display generation component, a second indica-tion that is different from the first indication.

In some embodiments, a computer system is disclosed. The computer system is configured to communicate with a display generation component, a short-range communica-tion radio, and a communication interface that is different from the short-range communication radio, and comprises: means for receiving, via the short-range communication radio, information from an electronic component that is part of a package that includes a physical account card, wherein one or more resources are associated with the physical account card; means, while logged into an account of a service, transmitting to an external device, via the commu-nication interface that is different from the short-range communication radio, for: a request to associate the one or more resources with the account of the service; and the information received from the electronic component; means, subsequent to transmitting the request to associate the one or more resources associated with the physical account card with the account, for receiving a response, wherein the response includes an indication, determined using the infor-mation received from the electronic component, of whether the package has been tampered with; means, in accordance with a determination that the response indicates that the package has not been tampered with, for displaying, via the display generation component, a first indication; and means, in accordance with a determination that the response indi-cates that the package has been tampered with, for display-ing, via the display generation component, a second indica-tion that is different from the first indication.

In some embodiments, a computer program product is disclosed. The computer program product comprises one or more programs configured to be executed by one or more processors of a computer system that is configured to communicate with a display generation component, a short-range communication radio, and a communication interface that is different from the short-range communication radio, the one or more programs including instructions for: receiv-ing, via the short-range communication radio, information from an electronic component that is part of a package that includes a physical account card, wherein one or more resources are associated with the physical account card; while logged into an account of a service, transmitting to an external device, via the communication interface that is different from the short-range communication radio: a request to associate the one or more resources with the account of the service; and the information received from the electronic component; subsequent to transmitting the request to associate the one or more resources associated with the physical account card with the account, receiving a response, wherein the response includes an indication, deter-mined using the information received from the electronic component, of whether the package has been tampered with; in accordance with a determination that the response indi-cates that the package has not been tampered with, display-ing, via the display generation component, a first indication; and in accordance with a determination that the response indicates that the package has been tampered with, display-ing, via the display generation component, a second indica-tion that is different from the first indication.

Executable instructions for performing these functions are, optionally, included in a non-transitory computer-read-able storage medium or other computer program product configured for execution by one or more processors. Execut-able instructions for performing these functions are, option-ally, included in a transitory computer-readable storage medium or other computer program product configured for execution by one or more processors.

Thus, devices are provided with faster, more efficient methods and interfaces for managing the security of physical account cards, thereby increasing the effectiveness, effi-ciency, and user satisfaction with such devices. Such meth-ods and interfaces may complement or replace other meth-ods for managing the security of physical account cards.

DESCRIPTION OF THE FIGURES

For a better understanding of the various described embodiments, reference should be made to the Description of Embodiments below, in conjunction with the following drawings in which like reference numerals refer to corre-sponding parts throughout the figures.

FIG. 4B illustrates an exemplary user interface for a multifunction device with a touch-sensitive surface that is separate from the display in accordance with some embodi-ments.

FIG. 7 is a flow diagram illustrating methods of associ-ating one or more resources with a physical account card, in accordance with some embodiments.

FIGS. 8A-8D illustrate exemplary user interfaces and techniques for accessing one or more resources associated with a physical account card, in accordance with some embodiments.

FIG. 9 is a flow diagram illustrating methods of accessing one or more resources associated with a physical account card, in accordance with some embodiments.

DESCRIPTION OF EMBODIMENTS

Figure 1A:
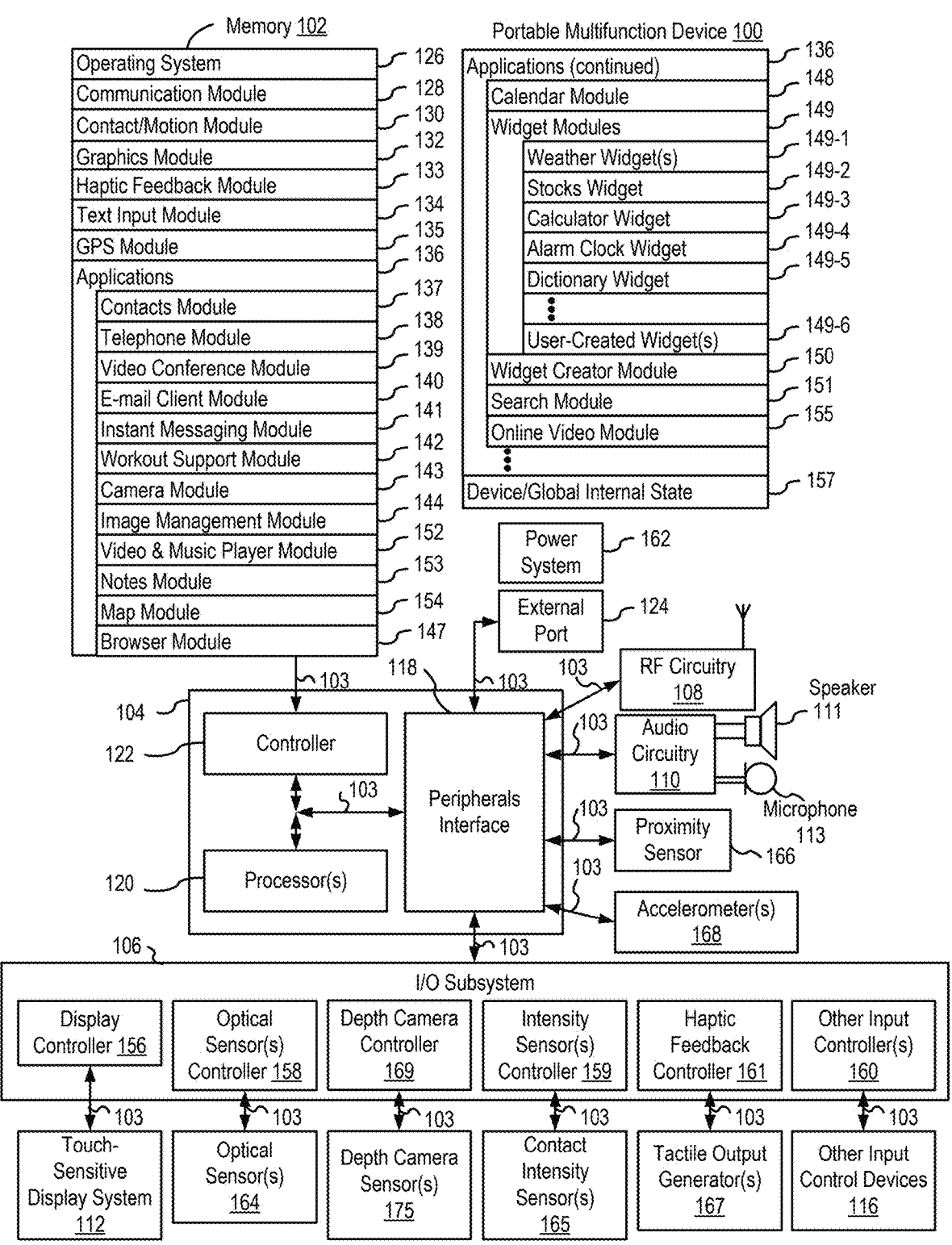
FIG. 1A is a block diagram illustrating a portable multi-function device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing the security of physical account cards. For example, physical account cards can be improperly accessed prior to use and/or a chip (e.g., an electronic component, such as an NFC chip) of the physical account card and/or a package of the physical account card may be improperly tampered with. Techniques to manage the security of physical account cards can improper the security of such cards and reduce the cognitive burden on a user who use such cards, thereby enhancing productivity. Further, such techniques can reduce processor and battery power otherwise wasted on redundant user inputs and security checks.

Below, FIGS. 1A-1B, 2, 3A-3G, 4A-4B, and 5A-5C provide a description of exemplary devices for performing the techniques for managing event notifications. FIGS. 6A-6D illustrate exemplary user interfaces and techniques for associating one or more resources with a physical account card, in accordance with some embodiments. FIG. 7 is a flow diagram illustrating methods of associating one or more resources with a physical account card, in accordance with some embodiments. The user interfaces in FIGS. 6A-6D are used to illustrate the processes described below, including the processes in FIG. 7. FIGS. 8A-8D illustrate exemplary user interfaces and techniques for accessing one or more resources associated with a physical account card, in accordance with some embodiments. FIG. 9 is a flow diagram illustrating methods of accessing one or more resources associated with a physical account card, in accordance with some embodiments. The user interfaces in FIGS. 8A-8D are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes secure element 163 for securely storing information. In some embodiments, secure element 163 is a hardware component (e.g., a secure microcontroller chip) configured to securely store data or an algorithm. In some embodiments, secure element 163 provides (e.g., releases) secure information (e.g., payment information (e.g., an account number and/or a transaction-specific dynamic security code), identification information (e.g., credentials of a state-approved digital identification), and/or authentication information (e.g., data generated using a cryptography engine and/or by performing asymmetric cryptography operations)). In some embodiments, secure element 163 provides (or releases) the secure information in response to device 100 receiving authorization, such as a user authentication (e.g., fingerprint authentication; passcode authentication; detecting double-press of a hardware button when device 100 is in an unlocked state, and optionally, while device 100 has been continuously on a user's wrist since device 100 was unlocked by providing authentication credentials to device 100, where the continuous presence of device 100 on the user's wrist is determined by periodically checking that the device is in contact with the user's skin). For example, device 100 detects a fingerprint at a fingerprint sensor (e.g., a fingerprint sensor integrated into a button) of device 100. Device 100 determines whether the detected fingerprint is consistent with an enrolled fingerprint. In accordance with a determination that the fingerprint is consistent with the enrolled fingerprint, secure element 163 provides (e.g., releases) the secure information. In accordance with a determination that the fingerprint is not consistent with the enrolled fingerprint, secure element 163 forgoes providing (e.g., releasing) the secure information.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3A:
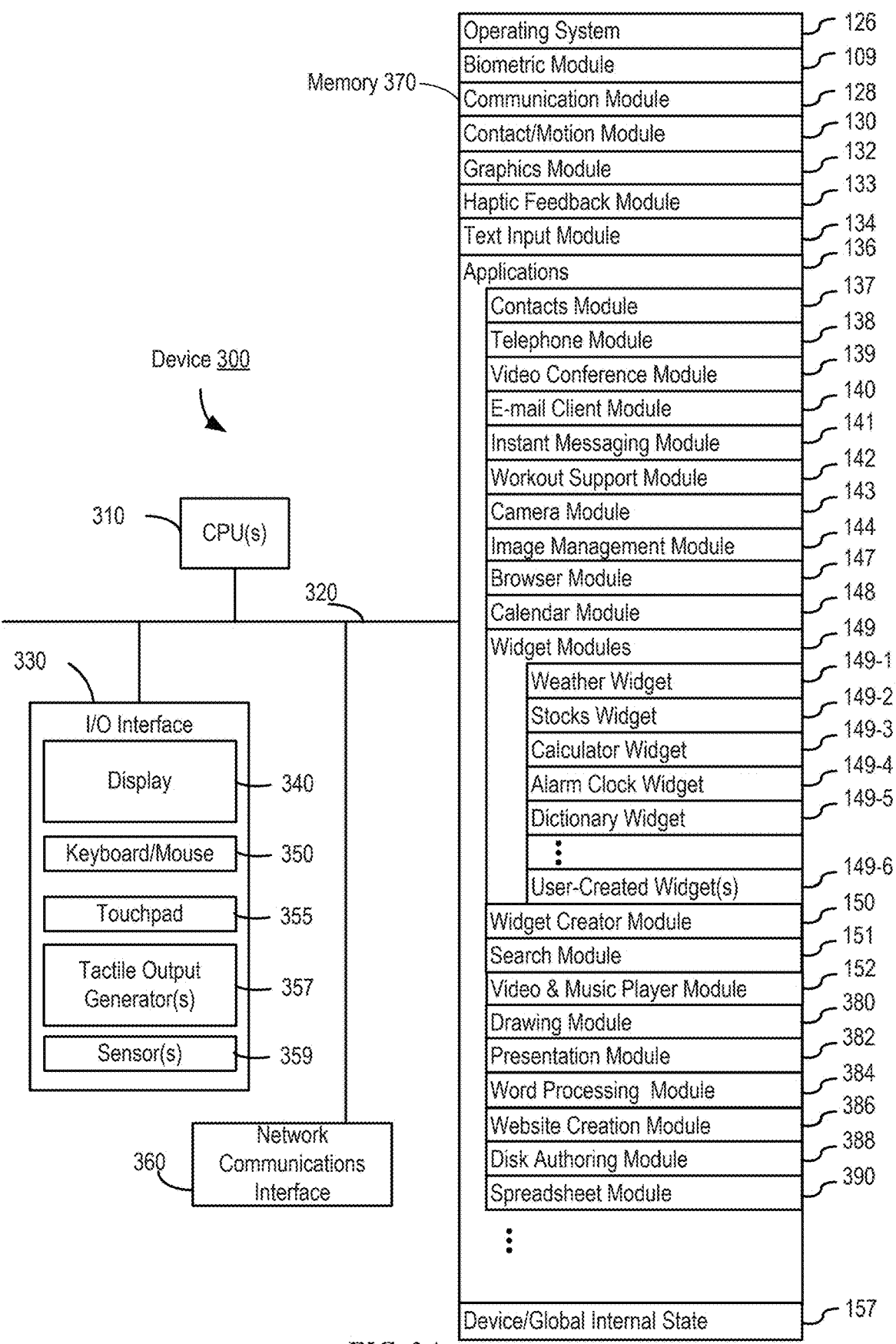
FIG. 3A is a block diagram of an exemplary multifunction device with a display and a touch-sensitive surface in accordance with some embodiments.

In some embodiments, the software components stored in memory 102 include operating system 126, biometric module 109, communication module (or set of instructions) 128, contact/motion module (or set of instructions) 130, graphics module (or set of instructions) 132, text input module (or set of instructions) 134, Global Positioning System (GPS) module (or set of instructions) 135, authentication module 105, and applications (or sets of instructions) 136. Furthermore, in some embodiments, memory 102 (FIG. 1A) or 370 (FIG. 3A) stores device/global internal state 157, as shown in FIGS. 1A and 3A. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE®, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Biometric module 109 optionally stores information about one or more enrolled biometric features (e.g., fingerprint feature information, facial recognition feature information, eye and/or iris feature information) for use to verify whether received biometric information matches the enrolled biometric features. In some embodiments, the information stored about the one or more enrolled biometric features includes data that enables the comparison between the stored information and received biometric information without including enough information to reproduce the enrolled biometric features. In some embodiments, biometric module 109 stores the information about the enrolled biometric features in association with a user account of device 100. In some embodiments, biometric module 109 compares the received biometric information to an enrolled biometric feature to determine whether the received biometric information matches the enrolled biometric feature.

Contact/motion module 130 optionally detects contact with touch screen 112 (in conjunction with display controller

156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Authentication module 105 determines whether a requested operation (e.g., requested by an application of applications 136) is authorized to be performed. In some embodiments, authentication module 105 receives for an operation to be perform that optionally requires authentication. Authentication module 105 determines whether the operation is authorized to be performed, such as based on a series of factors, including the lock status of device 100, the location of device 100, whether a security delay has elapsed, whether received biometric information matches enrolled biometric features, and/or other factors. Once authentication module 105 determines that the operation is authorized to be performed, authentication module 105 triggers performance of the operation.

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
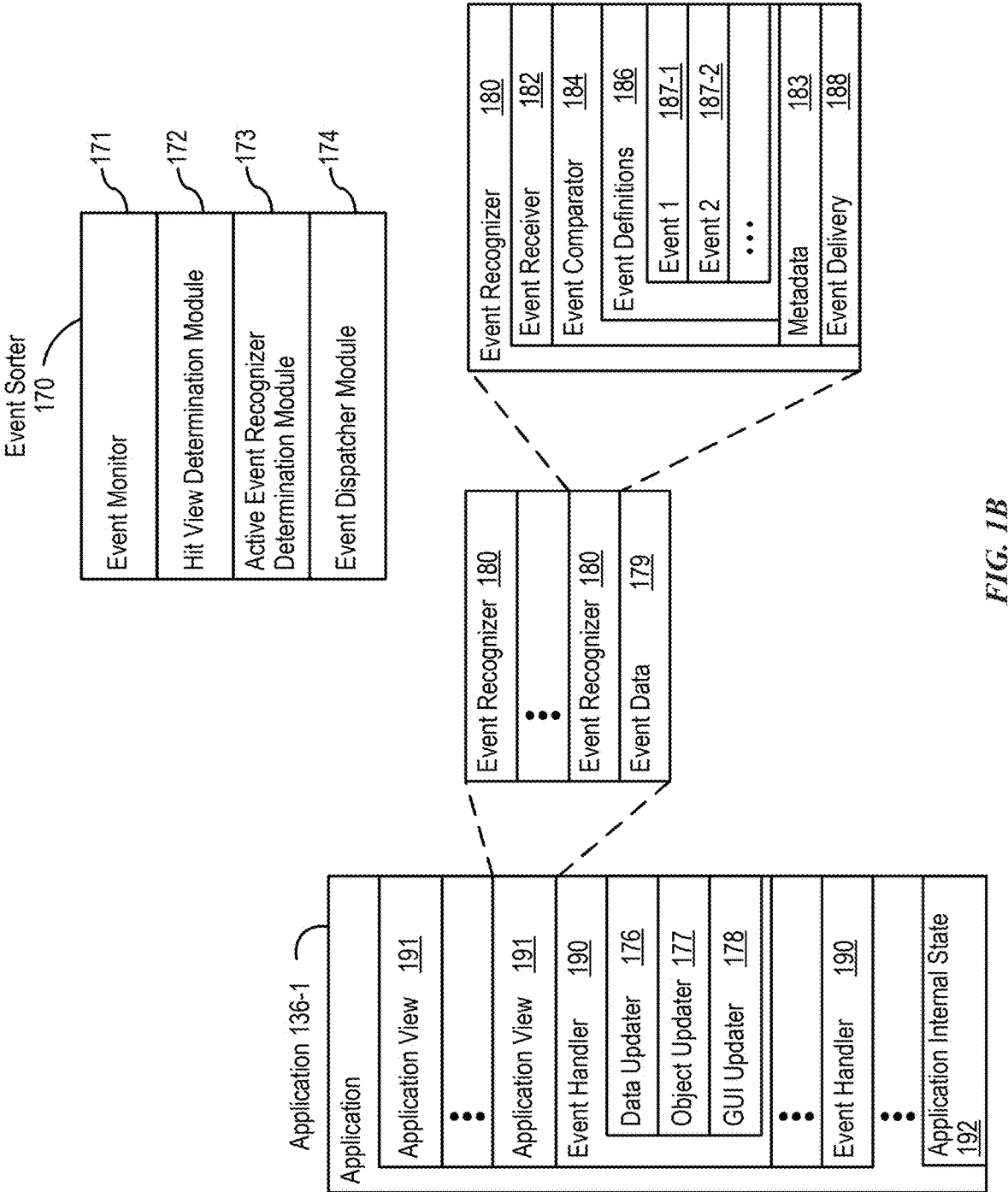
FIG. 1B is a block diagram illustrating exemplary com-ponents for event handling in accordance with some embodiments.

FIG. 1B is a block diagram illustrating exemplary components for event handling in accordance with some embodiments. In some embodiments, memory 102 (FIG. 1A) or 370 (FIG. 3A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
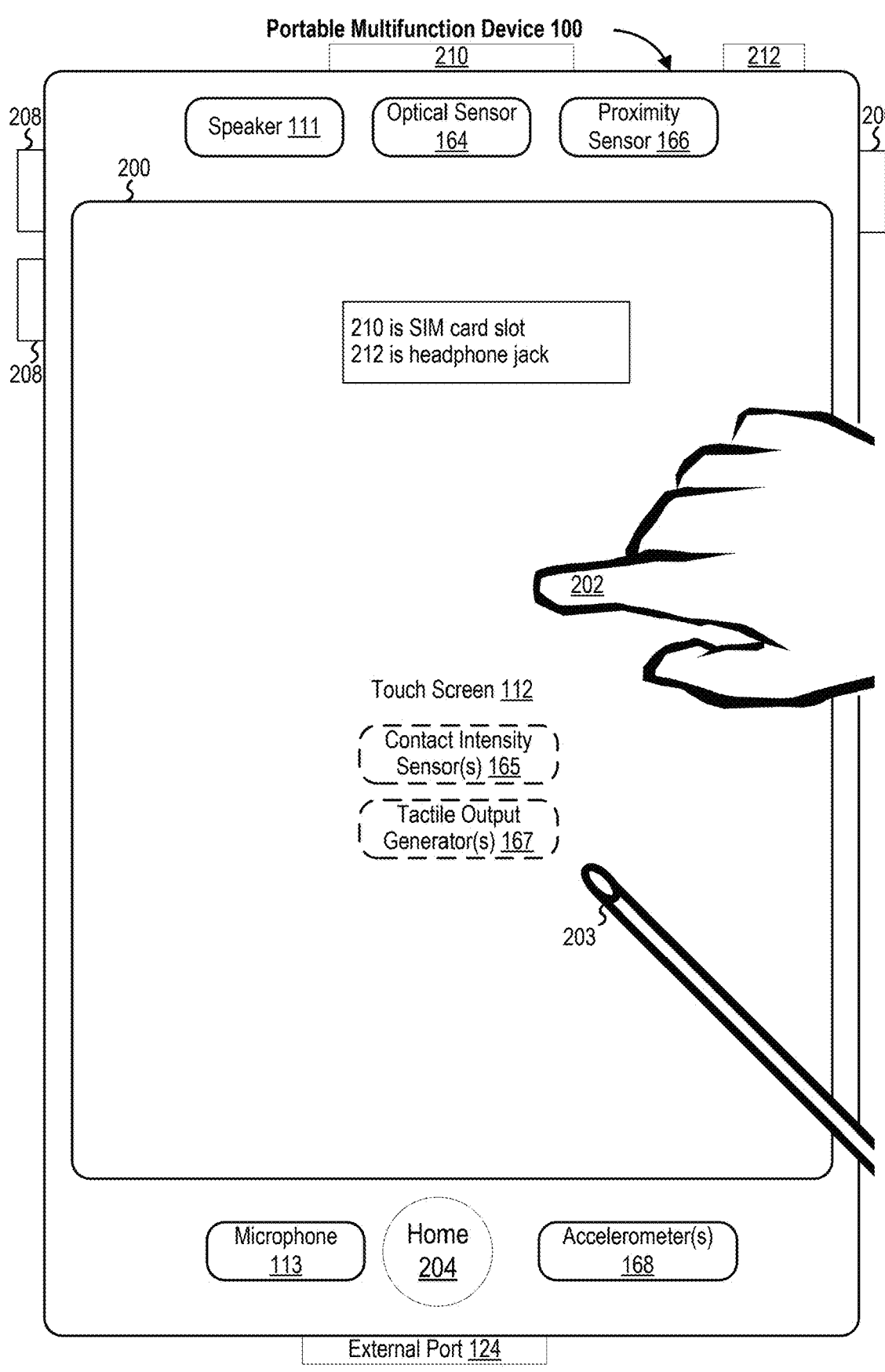
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
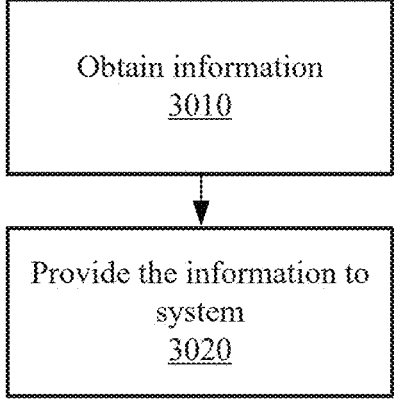
FIGS. 3B-3G illustrate the use of Application Program-ming Interfaces (APIs) to perform operations.
Figure 3C:
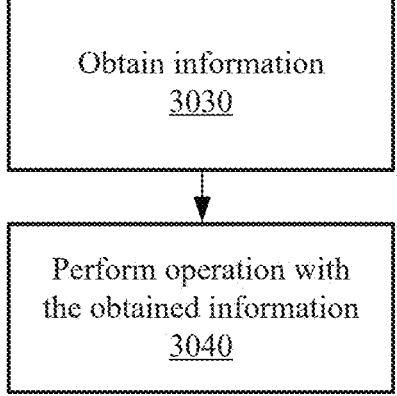

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
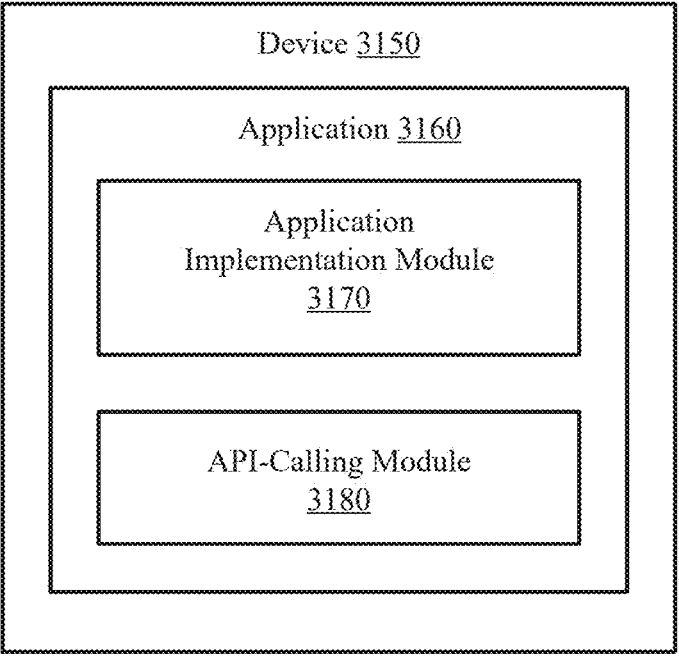
Figure 3E:
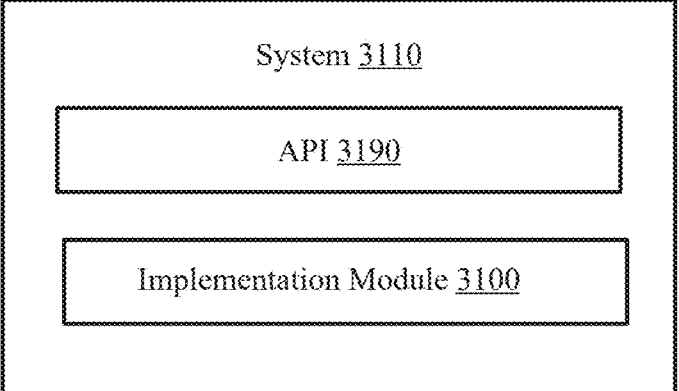
Figure 3F:
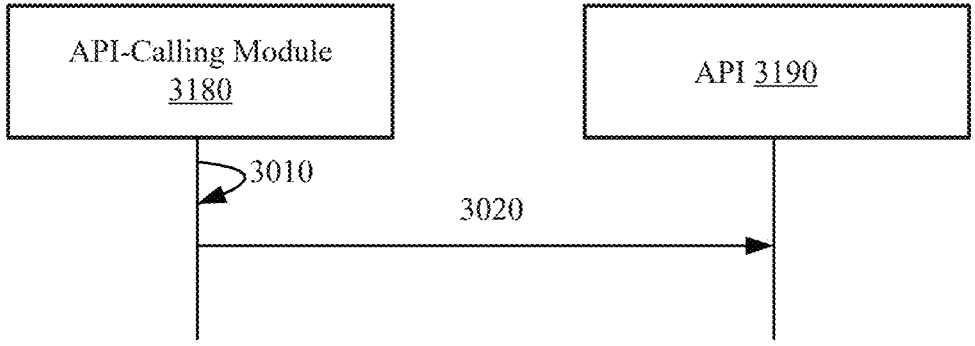

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
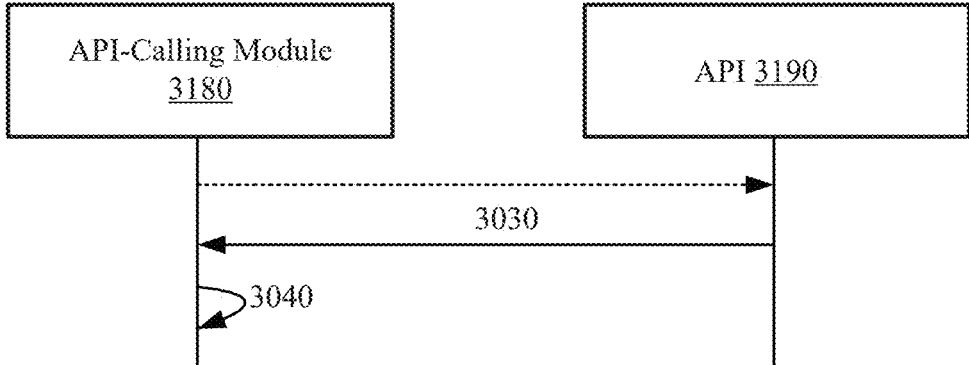

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform methods 700 and/or 900 (FIGS. 7 and/or 9) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that are, optionally, implemented on, for example, portable multifunction device 100.

Figure 4A:
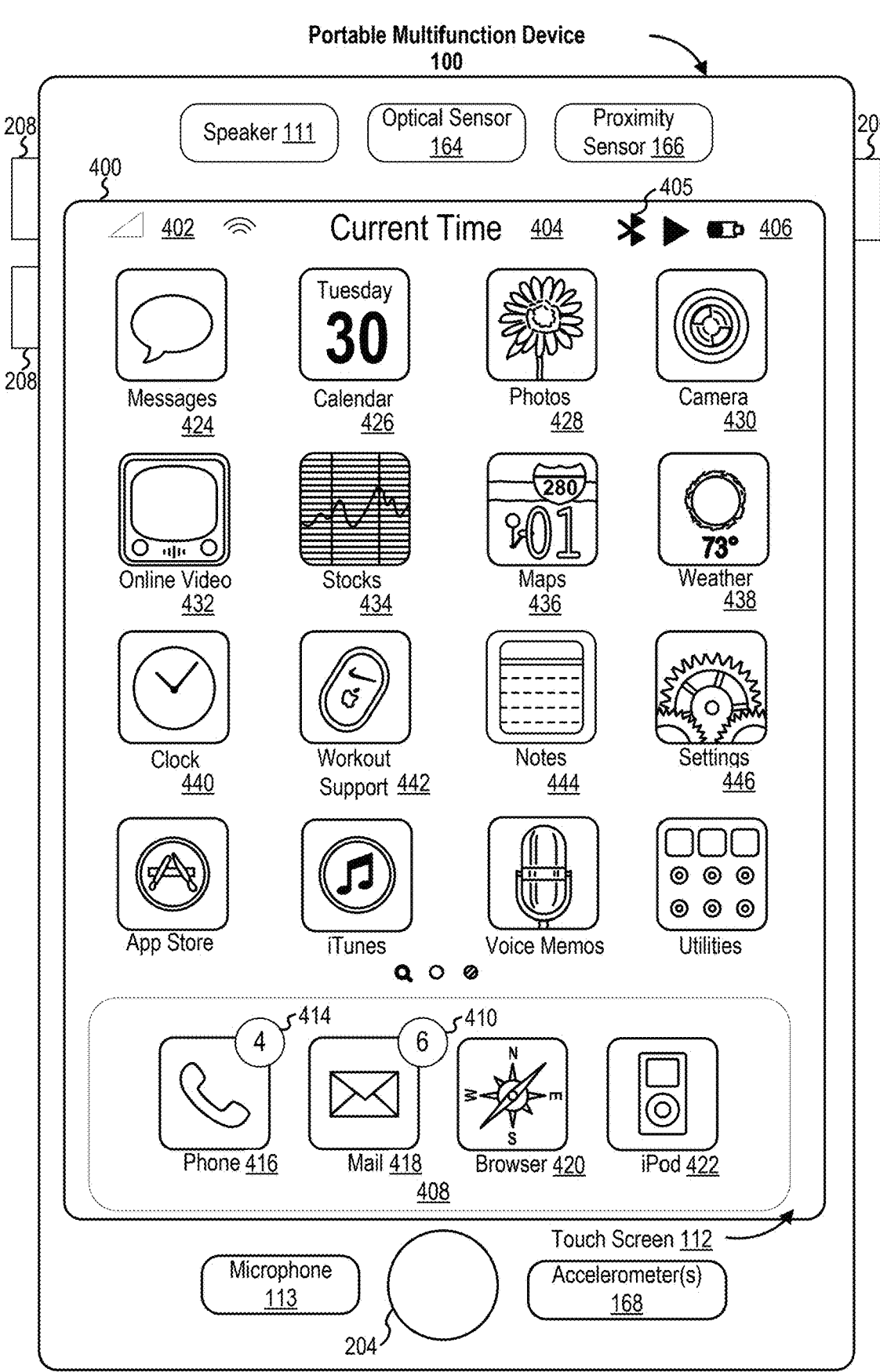
FIG. 4A illustrates an exemplary user interface for a menu of applications on a portable multifunction device in accor-dance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Device 300 also, optionally, includes one or more contact intensity sensors (e.g., one or more of sensors 359) for detecting intensity of contacts on touch-sensitive surface

451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., touch-sensitive surface 451 in FIG. 4B) are used by the device to manipulate the user interface on the display (e.g., display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
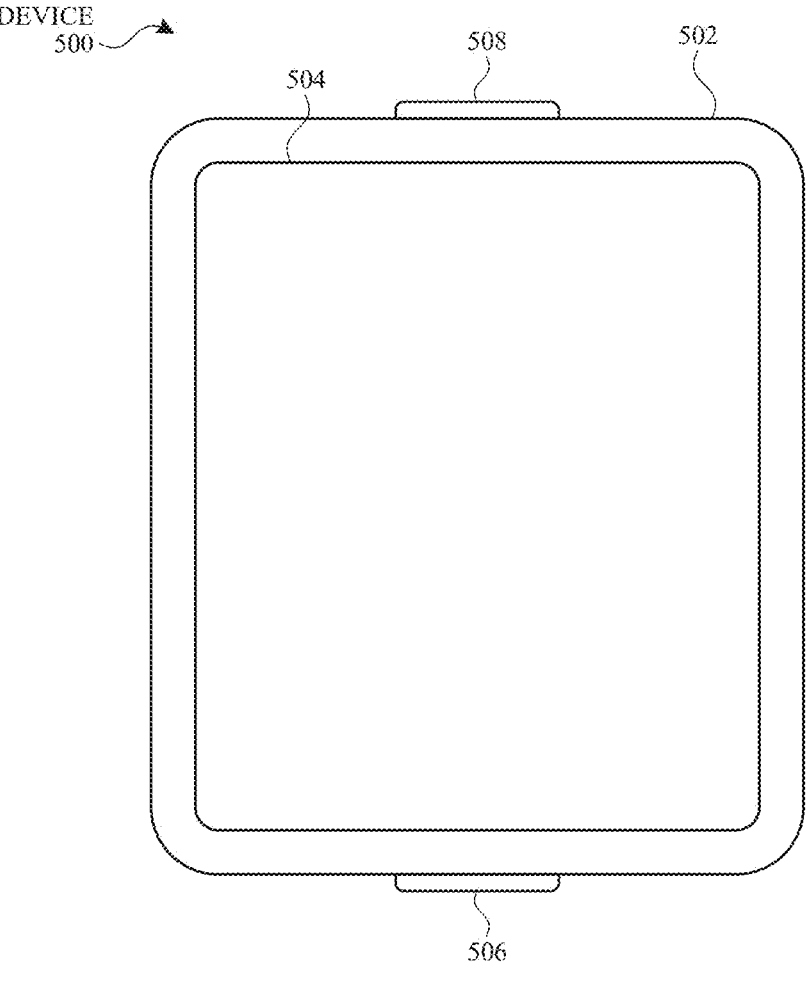
FIG. 5A illustrates a personal electronic device in accor-dance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
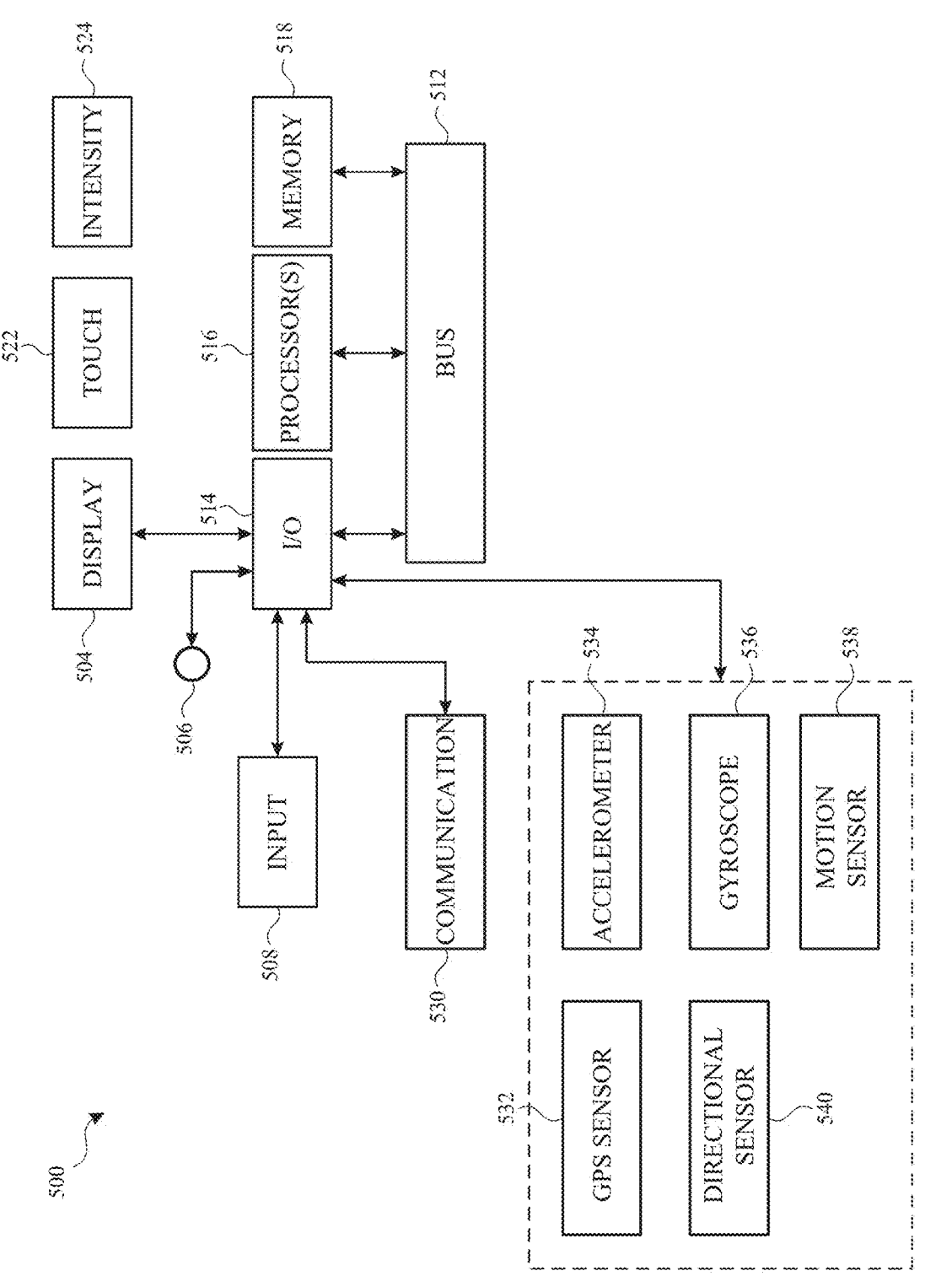
FIG. 5B is a block diagram illustrating a personal elec-tronic device in accordance with some embodiments.

FIG. 5B depicts exemplary personal electronic device 500. In some embodiments, device 500 can include some or all of the components described with respect to FIGS. 1A, 1B, and 3A. Device 500 has bus 512 that operatively couples I/O section 514 with one or more computer processors 516 and memory 518. I/O section 514 can be connected to display screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or

500 (FIGS. 1A, 3A, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
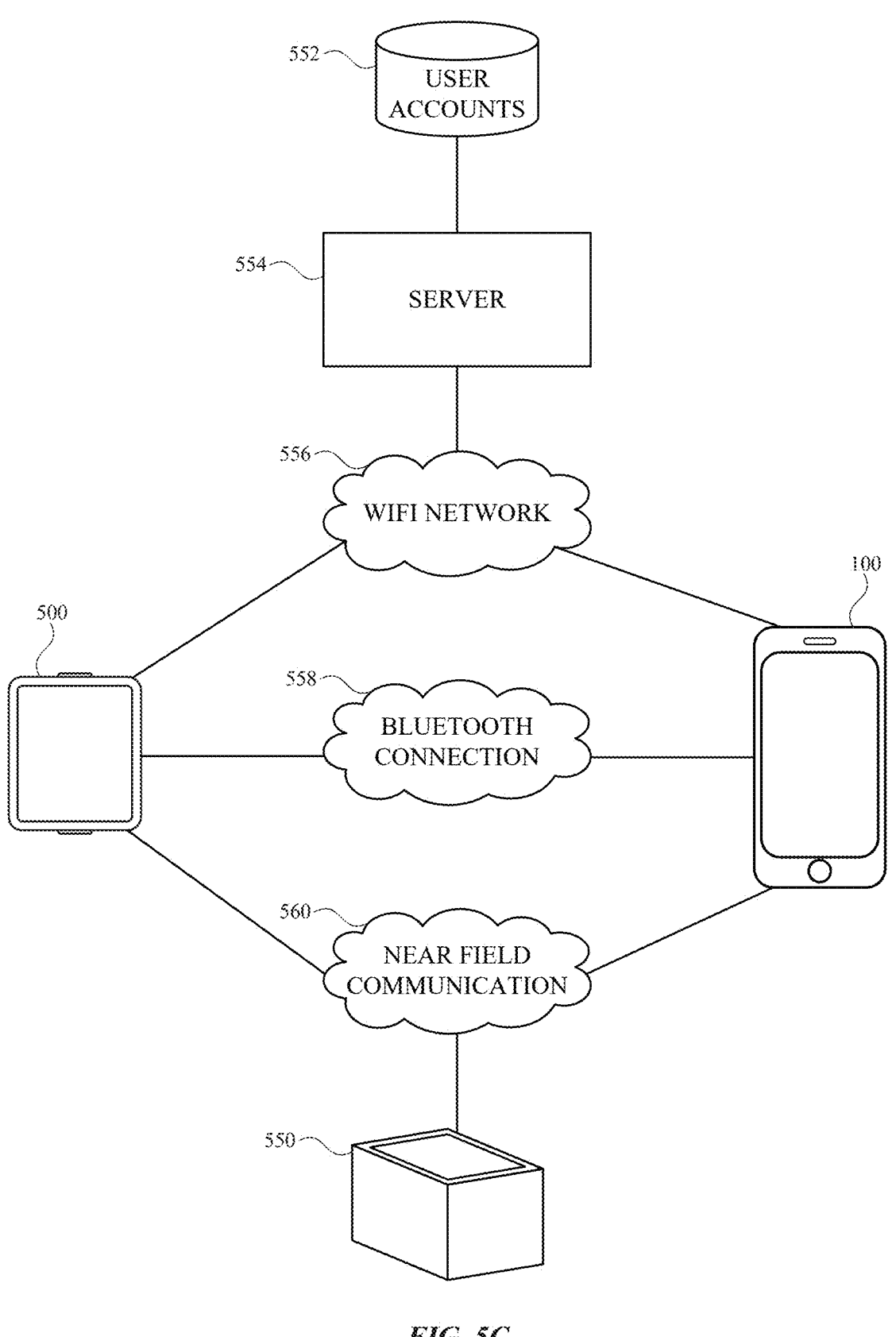
FIG. 5C illustrates exemplary devices connected via one or more communication channels, in accordance with some embodiments.

FIG. 5C illustrates exemplary devices connected via one or more communication channels to participate in a transaction and/or challenge-response process, in accordance with some embodiments. One or more exemplary electronic devices (e.g., devices 100, 300, and 500) are configured to optionally detect input (e.g., a particular user input and/or an NFC field) and optionally detect or transmit information (e.g., using NFC). The one or more electronic devices optionally include NFC hardware and are configured to be NFC-enabled. In some embodiments, the one or more exemplary electronic devices read information from a physical account card and/or a package of a physical account card (e.g., to transmit to server 554 or to POS terminal 550). In some embodiments, POS terminal 550 reads information from the physical account card and/or the package of a physical account card (e.g., to transmit to server 554 or to device 500).

The electronic devices (e.g., devices 100, 300, and 500) are optionally configured to store account information (e.g., resource account information and/or payment account information) associated with each of one or more accounts (e.g., one or more resource accounts and/or one or more payment accounts). Account information includes, for example, one or more of: a person's or company's name, a billing address, a login, a password, an account number, an expiration date, a security code, a telephone number, a bank associated with the payment account (e.g., an issuing bank), and a card network identifier. In some embodiments, account information includes include an image, such as a picture of a card (e.g., taken by the device and/or received at the device). In some embodiments, the electronic devices receive user input including at least some account information (e.g., receiving user-entered credit, debit, account, or gift card number and expiration date). In some embodiments, the electronic devices detect at least some account information from an image (e.g., of a payment card captured by a camera sensor of the device). In some embodiments, the electronic devices receive at least some account information from another device (e.g., another user device or a server). In some embodiments, the electronic device receives account information from a server associated with another service for which an account for a user or user device previously made a purchase or identified account data (e.g., an app for renting or selling audio and/or video files).

In some embodiments, an account is added to an electronic device (e.g., device 100, 300, and 500), such that account information is securely stored on the electronic device (e.g., on secure element 163). In some embodiments, after a user initiates such process, the electronic device transmits information for the account to a transaction-coordination server, which then communicates with a server operated by a payment network for the account (e.g., a payment server and/or an account management server) to ensure a validity of the information. The electronic device is optionally configured to receive a script from the server that allows the electronic device to program information for the account onto a secure element (e.g., secure element 163).

In some embodiments, communication among electronic devices 100, 300, and 500 facilitates transactions (e.g., generally or specific transactions). For example, a first electronic device (e.g., 100) can serve as a provisioning or managing device, and can send notifications of new or updated account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about transactions facilitated at the first electronic device. The information optionally includes one or more of: a payment amount, an account used, a time of purchase, and whether a default account was changed. The second device (e.g., 500) optionally uses such information to update a default account (e.g., based on a learning algorithm or explicit user input).

Electronic devices (e.g., 100, 300, 500) are configured to communicate with each other over any of a variety of networks. For example, the devices communicate using a Bluetooth connection 558 (e.g., which includes a traditional Bluetooth connection or a Bluetooth Low Energy connection) or using a WiFi network 556. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) terminal 550, which is optionally NFC-enabled. The communication optionally occurs using a variety of communication channels and/or technologies. In some embodiments, electronic device (e.g., 100, 300, 500) communicates with terminal 550 using an NFC channel 560. In some embodiments, terminal 550 communicates with an electronic device (e.g., 100, 300, 500) using a peer-to-peer NFC mode. Electronic device (e.g., 100, 300, 500) is optionally configured transmit a signal to terminal 550 that includes information for an account (e.g., a default account or an account selected for the particular transaction).

In some embodiments, proceeding with a transaction includes transmitting a signal that includes information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to terminal 550. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element (e.g., 163) in the electronic device (e.g., 100, 300, 500). The secure element (e.g., 163) optionally requires a particular user input prior to releasing payment information. For example, the secure element (e.g., 163) optionally requires detection that the electronic device is being worn, detection of a button press, detection of entry of a passcode, detection of a touch, detection of one or more option selections (e.g., received while interacting with an application), detection of a finger-print signature, detection of a voice or voice command, and or detection of a gesture or movement (e.g., rotation or acceleration). In some embodiments, if a communication channel (e.g., an NFC communication channel) with another device (e.g., terminal 550) is established within a defined time period from detection of the input, the secure element (e.g., 163) releases payment information to be transmitted to the other device (e.g., terminal 550). In some embodiments, the secure element (e.g., 163) is a hardware component that controls release of secure information. In some embodi-ments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corre-sponding condition for a phone does not require button-depression and instead requires detection of particular inter-action with an application. In some embodiments, a condition for transmitting and/or releasing payment infor-mation includes receiving particular input on each of mul-tiple devices. For example, release of payment information optionally requires detection of a fingerprint and/or passcode at the device (e.g., device 100) and detection of a mechanical input (e.g., button press) on another device (e.g., device 500).

Terminal 550 optionally uses the information to generate a signal to transmit to server 554 to determine whether the payment is authorized. Server 554 optionally includes any device or system configured to receive payment information associated with a payment account and to determine whether a proposed purchase is authorized. In some embodiments, server 554 includes a server of an issuing bank. Terminal 550 communicates with server 554 directly or indirectly via one or more other devices or systems (e.g., a server of an acquiring bank and/or a server of a card network).

Server 554 optionally uses at least some of the payment information to identify a user account from among a data-base of user accounts (e.g., 552). For example, each user account includes payment information. An account is, optionally, located by locating an account with particular payment information matching that from the POS commu-nication. In some embodiments, a payment is denied when provided payment information is not consistent (e.g., an expiration date does not correspond to a credit, debit or gift card number) or when no account includes payment infor-mation matching that from the POS communication.

In some embodiments, data for the user account further identifies one or more restrictions (e.g., credit limits); cur-rent or previous balances; previous transaction dates, loca-tions and/or amounts; account status (e.g., active or frozen), and/or authorization instructions. In some embodiments, the server (e.g., 554) uses such data to determine whether to authorize a payment. For example, a server denies a pay-ment when a purchase amount added to a current balance would result in exceeding an account limit, when an account is frozen, when a previous transaction amount exceeds a threshold, or when a previous transaction count or frequency exceeds a threshold.

In some embodiments, server 554 responds to POS ter-minal 550 with an indication as to whether a proposed purchase is authorized or denied. In some embodiments, POS terminal 550 transmits a signal to the electronic device (e.g., 100, 300, 500) to identify the result. For example, POS terminal 550 sends a receipt to the electronic device (e.g., 100, 300, 500) when a purchase is authorized (e.g., via a transaction-coordination server that manages a transaction app on the user device). In some instances, POS terminal 550 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS terminal 550. For example, upon detecting that a mechanical input has been received, a secure element (e.g., 163) in the electronic device (e.g., 100, 300, 500) releases payment information to allow an appli-cation on the electronic device to access the information (e.g., and to transmit the information to a server associated with the application).

Attention is now directed towards embodiments of user interfaces ("UI") and associated processes that are imple-mented on a computer system, such as portable multifunc-tion device 100, device 300, or device 500.

FIGS. 6A-6D illustrate exemplary user interfaces and techniques for associating one or more resources with a physical account card, in accordance with some embodi-ments. The user interfaces in these figures are used to illustrate the processes described below, including the pro-cesses in FIG. 7.

Figure 6A:
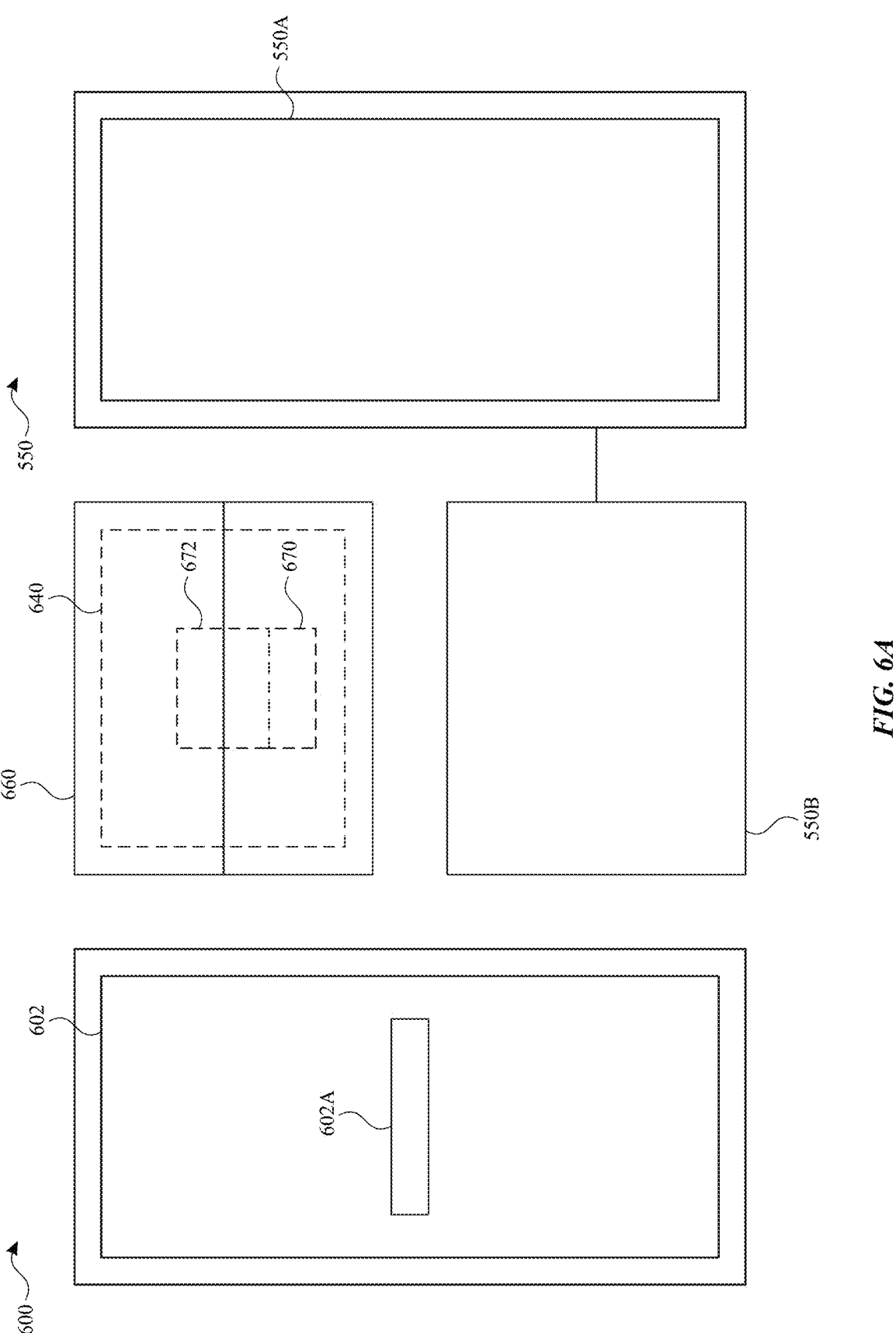
FIGS. 6A-6D illustrate exemplary user interfaces and techniques for associating one or more resources with a physical account card, in accordance with some embodi-ments.
Figure 6B:
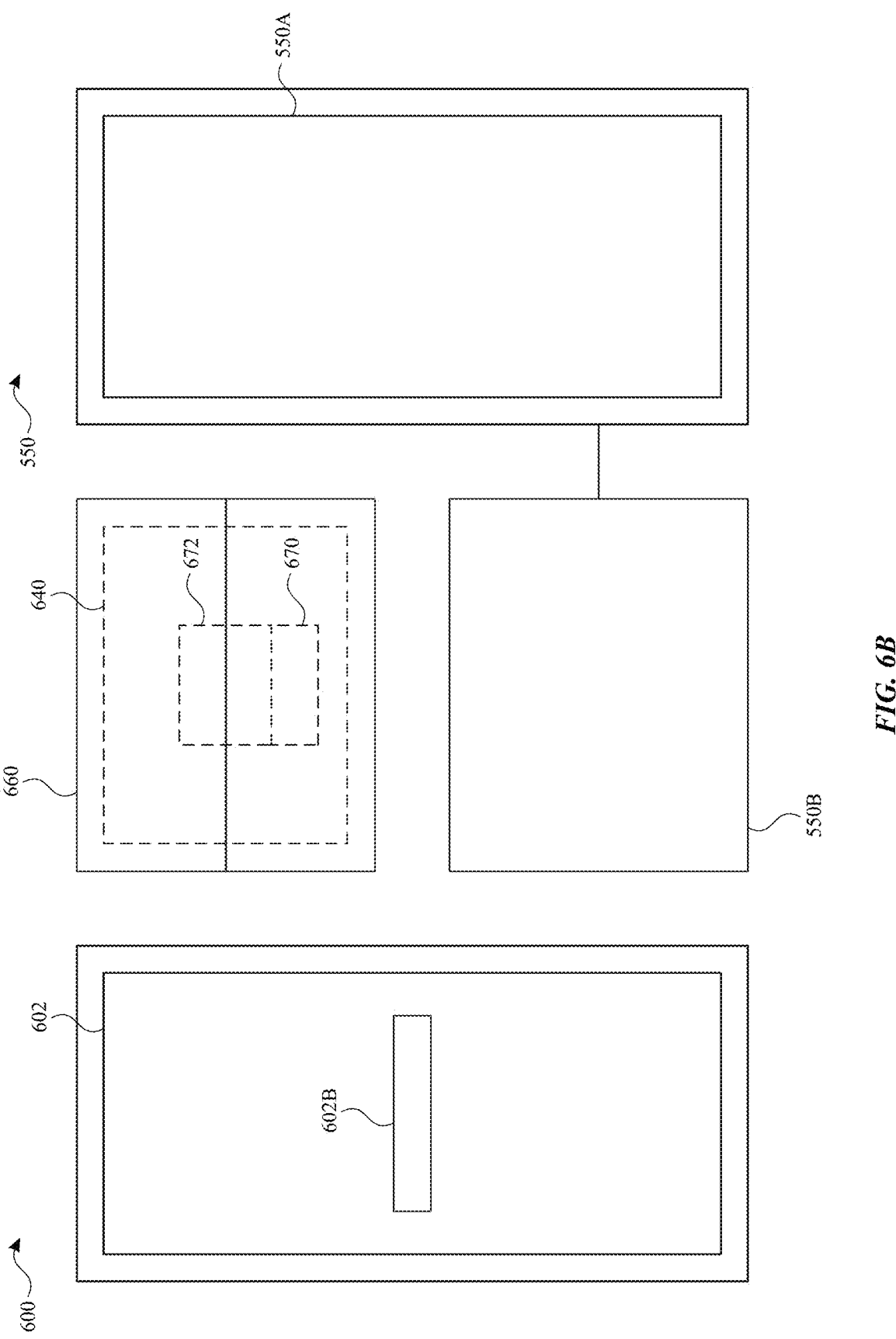

FIGS. 6A-6B illustrate an exemplary scenario where package 660 has not been tampered with. FIG. 6A illustrates package 660, which is closed. Physical account card 640 is inside package 660. Physical account card 640 is, for example, an employee badge, a building access card, and/or a gift card that has optionally not yet been assigned resources. For example, the employee badge has not been assigned access to any printers or computers (e.g., to enable printing or to enable use of the computer by a user). For another example, the building access card has not been assigned access to any buildings or areas (e.g., to unlock doors). For another example, the gift card has not been assigned (e.g., loaded or associated with) any funds. Pack-age 660 also includes electronic component 670, such as a security-enabled component, a short-range communication component, and/or a near field communication (NFC) com-ponent (e.g., an NFC chip). Electronic component 670 is optionally configured for two-way communication. Elec-tronic component 670 includes (and/or is connected to) wire loop 672. Wire loop 672 remains intact when package 660 has not been tampered with (e.g., has not been opened or has not been improperly accessed). In some embodiments, wire loop 672 breaks when package 660 has been tampered with (e.g., has been opened or has been improperly accessed). In some embodiments, electrical properties of wire loop 672 changes (e.g., to be outside of a defined acceptable range) when package 660 has been tampered with. In some embodi-ments, when wire loop 672 is intact and/or electrical prop-erties of wire loop 672 have not changed (e.g., are within the defined acceptable range), electronic component 670 pro-vides information as part of responses to challenges in a response-challenge process that authenticates electronic component 670 as confirming that package 660 has not been tampered with. In some embodiments, when wire loop 672 is not intact and/or the electrical properties of wire loop 672 have changed (e.g., to be outside of the defined acceptable range), electronic component 670 provides information as part of responses to challenges in a response-challenge process that does not authenticate electronic component 670 as confirming that package 660 has not been tampered with and/or authenticates electronic component 670 as confirming that package 660 has been tampered with. In some embodiments, wire loop 672 is an antenna of electronic component 670 and electronic component 670 has limited (or no) communication when wire loop 672 is not intact.

The techniques described with respect to FIGS. 6A-6D can be equally performed by computer system 600 or by point-of-sale (POS) terminal 550. At FIG. 6A, computer system 600 (e.g., a smart phone, a smart watch, and/or a laptop) includes display 602. Computer system 600 is brought within communication range of electronic component 670. While within communication range (e.g., NFC communication range) of electronic component 670, computer system 600 transmits (e.g., via an NFC interface of computer system 600) a challenge to electronic component 670 and, subsequently (e.g., in response), receives a response to the challenge from electronic component 670 as part of a challenge-response communication. In some embodiments, computer system 600 powers electronic component 670 during all or part of the challenge-response communication. In some embodiments, computer system 600 generates the challenge before transmitting the challenge to electronic component 670. In some embodiments, computer system 600 receives the challenge from a server, such as server 554, or bases the challenge on data received from server 554. Computer system 600 transmits information contained in the response to server 554 (and, optionally, transmits the challenge to server 554) to enable server 554 to determine whether package 660 has been tampered with or not. During this process, computer system 600 optionally displays indication 602A that a check is being performed. In some embodiments, scanner 550B of POS terminal 550 (rather than computer system 600) is brought within communication range of electronic component 670 to participate in the challenge-response communication and displays indication 550A.

Server 554 receives (e.g., from computer system 600 and/or POS terminal 550) the information provided by electronic component 670 during the challenge-response communication. Server 554 also receives a request (e.g., from computer system 600 and/or POS terminal 550) to associate one or more resources with physical account card 640. The one or more resources optionally include access to a building or location (e.g., when physical account card 640 is an access badge) and/or funds (e.g., when physical account card 640 is a gift card) (e.g., $20, $100, or $200).

Server 554 uses the information provided by electronic component 670 during the challenge-response communication to determine whether package 660 has been tampered with. For example, server 554 uses the information from electronic component 670 to determine if the information (e.g., the response or as part of the response) is a valid response to the challenge that was provided to electronic component 670, thereby authenticating electronic component 670. In some embodiments, when the information is a valid response to the challenge, server 554 determines that package 660 has not been tampered with and, therefore, physical account card 640 is secure. In some embodiments, when the information is not a valid response to the challenge (and/or does not authenticate electronic component 670), server 554 determines that package 660 has been tampered with and, therefore, physical account card 640 is not secure.

At FIG. 6B, server 554 has determined that package 660 has not been tampered with and, therefore, has associated the requested one or more resources with physical account card 640. For example, server 554 updates a database to correspond (e.g., associate and/or link) the one or more resources with an identifier (e.g., serial number and/or identification code) of physical account card 640. Server 554 transmits an indication to computer system 600 and/or POS terminal 550 that package 660 has not been tampered with and/or that the request has been approved. At FIG. 6B, computer system 600 (or, alternatively, POS terminal 550) displays an indication (e.g., 602B and/or 550A) that the request to associate the one or more resources with physical account card 640 was approved. Once the one or more resources are associated with physical account card 640, a user can use physical account card 640 to access those resources (e.g., move the resources to another account and/or read information about the resources), as described in greater detail with respect to FIGS. 8A-8D and 9.

Figure 6C:
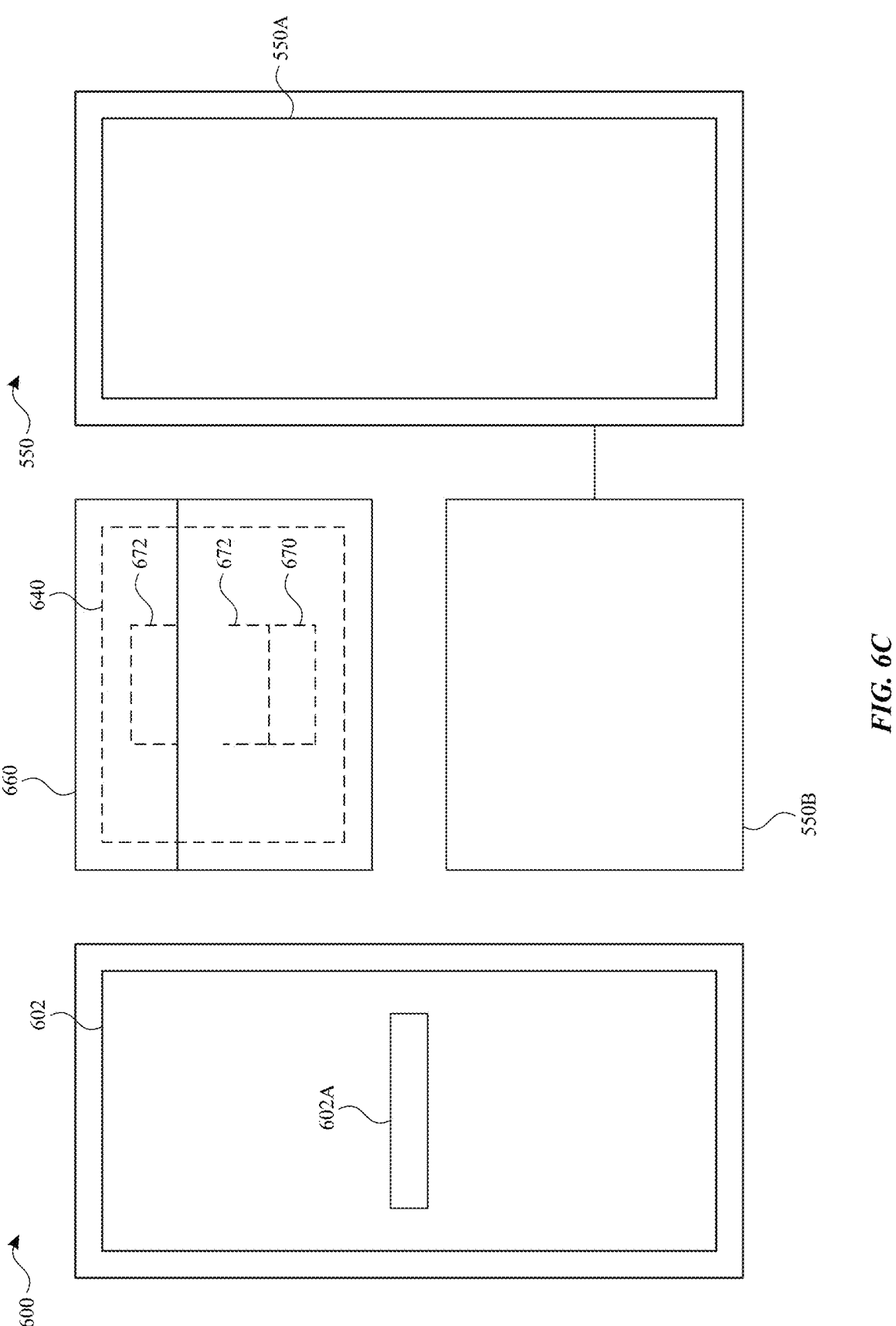
Figure 6D:
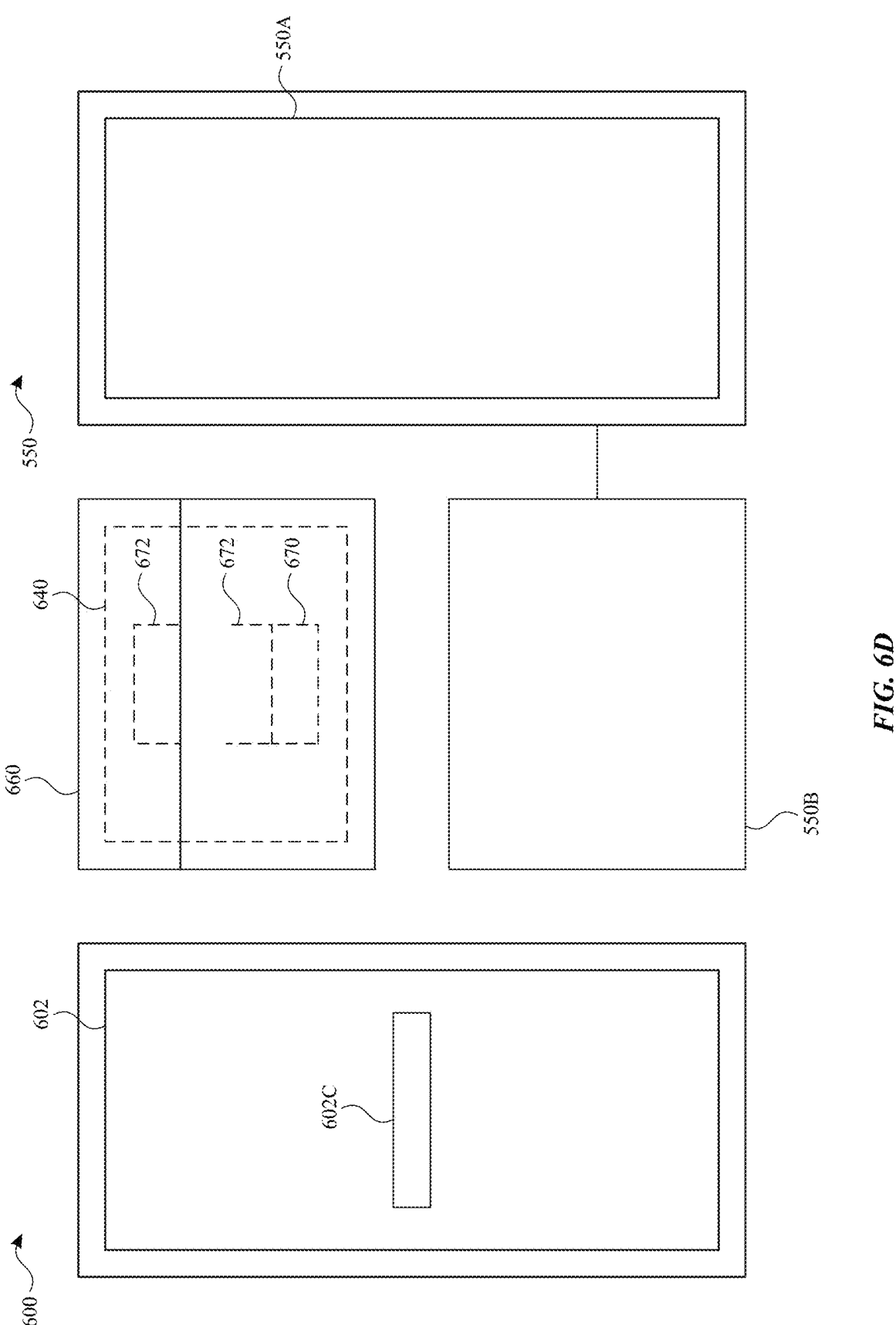

FIGS. 6C-6D illustrate an exemplary scenario where package 660 has been tampered with. At FIG. 6C, the lid of package 660 has been opened, thereby breaking wire loop 672 and/or changing (e.g., increasing and/or decreasing electrical properties (e.g., resistance and/or capacitance) of wire loop 672 to be outside of a defined acceptable range. Computer system 600 and/or POS terminal 550 communicates the challenge to electronic component 670 and receives a response from electronic component 670 that includes information as part of the challenge-response communication. As described above with respect to FIG. 6A, computer system 600 and/or POS terminal 550 transmits the information from electronic component 670 to server 554.

Server 554 uses the information provided by electronic component 670 during the challenge-response communication to determine whether package 660 has been tampered with. At FIG. 6D, server 554 has determined that package 660 has been tampered with (e.g., based on the information received as part of the challenge-response process) and has, therefore, not associated the requested one or more resources with physical account card 640. For example, server 554 does not update the database to correspond the one or more resources with the identifier of physical account card 640. Server 554 transmits an indication to computer system 600 and/or POS terminal 550 that package 660 has been tampered with and/or that the request has not been approved. At FIG. 6D, computer system 600 (or, alternatively, POS terminal 550) displays an indication (e.g., 602C and/or 550A) that the request to associate the one or more resources with physical account card 640 was not approved.

Accordingly, server 554 can confirm the security and/or authenticity of package 660 and, accordingly, of physical account card 640 before associating resources with physical account card 640.

FIG. 7 is a flow diagram illustrating methods of associating one or more resources with a physical account card, in accordance with some embodiments. Method 700 is performed at a computer system (e.g., 100, 300, 500, 550, 554, and/or 600) (e.g., a server, a smartphone, a smartwatch, a tablet computer, a laptop computer, a desktop computer, and/or a head mounted device (e.g., a head mounted augmented reality and/or extended reality device)). Some operations in method 700 are, optionally, combined, the orders of some operations are, optionally, changed, and some operations are, optionally, omitted.

As described below, method 700 provides an intuitive way for associating one or more resources with a physical account card. The method reduces the cognitive burden on a user for associating one or more resources with a physical account card, thereby creating a more efficient human-machine interface. For battery-operated computing devices, enabling a user to associating one or more resources with a physical account card faster and more efficiently conserves power and increases the time between battery charges.

The computer system (e.g., server 554 and/or 600) receives (702) (e.g., directly and/or indirectly) (e.g., from the electronic component (e.g., 670), from a badge reader, from a proximity card reader (e.g., 550B), from a handheld mobile device (e.g., a phone and/or a tablet) (e.g., 600), from a card reader, and/or from a point-of-sale terminal) information provided by an electronic component (e.g., 670) (e.g., an NFC chip, an RFID chip, and/or a passive close-range communication circuit) that is part of (e.g., included in, attached to, and/or embedded into) (e.g., part of the packaging of the package and/or part of the physical account card that is inside the package) a package (e.g., 660) (e.g., a physical account card package, an envelope, a wrapping, and/or a box) that includes a physical account card (e.g., 640) (e.g., a security badge, an identification card, and/or a gift card) (e.g., that is the same or similar size as a credit card and/or is made using plastic). In some embodiments, the package includes packaging and the physical account card. In some embodiments, the electronic component is part of the package, the packaging, and/or the physical account card.

The computer system (e.g., server 554 and/or 600) receives (704) (e.g., from a badge reader, from a proximity card reader, from a handheld mobile device (e.g., a phone and/or a tablet), from a card reader, and/or from a point-of-sale terminal) a request to associate one or more resources (e.g., building access, room access, and/or funds) with the physical account card (e.g., 640). In some embodiments, the information provided by the electronic component is received as part of the request to associate one or more resources. In some embodiments, the information provided by the electronic component is received separately (before or after) from the request to associate one or more resources. In some embodiments, the one or more resources are selected and/or determined by a device other than the electronic component (e.g., by the badge reader, the proximity card reader, the handheld mobile device (e.g., a phone and/or a tablet), the card reader, and/or the point-of-sale terminal).

In accordance with (and, optionally, based on and/or in response to receiving the request to associate the one or more resources with the physical account card (e.g., 640)) a determination that a set of one or more conditions is met, including a first condition that is met when the information indicates that the package (e.g., 660) (e.g., the packaging (e.g., the box and/or the envelope) of the package, the physical account card that is part of the package, and/or the electronic component) has not been tampered with (e.g., has not been improperly accessed, has not been opened, has not been modified, and/or has not been removed and replaced), the computer system (e.g., server 554 and/or 600) associates (706) the one or more resources with the physical account card (e.g., 640) (e.g., such as by updating a database stored at the computer system to associate the resources with the card).

In accordance with (and, optionally, based on and/or in response to receiving the request to associate the one or more resources with the physical account card) a determination that the set of one or more conditions is not met (e.g., the information does not indicate the package has not been tampered with and/or indicates that the package has been tampered with), the computer system (e.g., server 554 and/or 600) forgoes (708) associating the one or more resources with the physical account card.

In some embodiments, the physical account card (e.g., 640) is a building access card. In some embodiments, when the building access card is active, a building access reader (e.g., a badge reader) accesses information on the physical account card to determine whether the building access card has access to a particular location (e.g., building and/or room).

In some embodiments, the physical account card (e.g., 640) is a gift card. In some embodiments, the one or more resources are funds that are to be associated with the gift card. Once the funds are associated with the gift card, an owner of the funded gift card can transfer and/or associate those funds with the owner's user account, thereby accessing the funds for use to make purchases.

In some embodiments, the electronic component (e.g., 670) (e.g., an NFC chip, an RFID chip, and/or a passive close-range communication circuit) is part of (e.g., included in, attached to, and/or embedded into) packaging (e.g., box, envelope, and/or wrap) of the package (e.g., 660) (e.g., a physical account card package, an envelope, a wrapping, and/or a box) and the electronic component (e.g., 670) is not part of the physical account card (e.g., 640). In some embodiments, the physical account card includes a second (separate) electronic component (e.g., an NFC chip, an RFID chip, and/or a passive close-range communication circuit) that is different from the electronic component.

In some embodiments, the information is part of a response of a challenge-response process. In some embodiments, a challenge-response process is a process during which the electronic component is presented (e.g., by the computer system, by a server, and/or point-of-sale terminal) with a challenge and the electronic component uses the challenge to provide a valid response to be authenticated (and include response to not be authenticated). In some embodiments, the information is the response of the challenge-response process.

In some embodiments, the computer system (e.g., server 554 and/or 600) generates a challenge to be transmitted (e.g., by a mobile device and/or a point-of-sale (POS) terminal) to the electronic component (e.g., 670). In some embodiments, the computer system transmits the challenge to the electronic component directly and/or indirectly (e.g., via the POS terminal).

In some embodiments, a point-of-sale terminal (e.g., 550) generates a challenge and transmits the challenge to the electronic component (e.g., 670). In some embodiments, the computer system does not generate the challenge. In some embodiments, the computer system receives the challenge (and, optionally, the response from the electronic component) from the point-of-sale terminal for use in the challenge-response authentication process.

In some embodiments, the computer system (e.g., server 554 and/or 600) receives, via a point-of-sale terminal (e.g., 550), a challenge that was transmitted to the electronic component (e.g., 670) for use in the challenge-response process. In some embodiments, the point-of-sale terminal (e.g., 550) and/or the device (e.g., 600) transmit the challenge to both the electronic component (e.g., 670) and to the computer system (e.g., server 554).

In some embodiments, the electronic component (e.g., 670) determines whether the package (e.g., 660) (e.g., the packaging (e.g., the box and/or the envelope) of the package, the physical account card that is part of the package, and/or the electronic component) has been tampered with based on a status of physical surroundings of the electronic component (e.g., 670) (e.g., based on a capacitance, based on a resistance, and/or based on the packaging having been opened). In some embodiments, the status of the physical surroundings is determined using a resistance wire, a wire loop, and/or capacitive sensing (e.g., sensing the peeling of a label).

In some embodiments, the electronic component (e.g., 670) determines that the package (e.g., 660) has been tampered with when the electronic component (e.g., 670) detects that the physical account card (e.g., 640) and/or packaging of the package (e.g., 660) have been tampered with.

In some embodiments, the electronic component (e.g., 670) determines that the package (e.g., 660) has been tampered with when the electronic component (e.g., 670) detects that the electronic component (e.g., 670) has been removed from the package (e.g., 660) and/or the physical account card (e.g., 640) (e.g., based on at least a portion of the circuitry of the electronic component being disconnected from and/or shorted to another portion of the electronic component). In some embodiments, the electronic component (e.g., 670) is attached to the physical account card (e.g., 640) and the physical account card (e.g., 640) is tampered with when the electronic component (e.g., 670) is detached attached (e.g., fully or partially).

In some embodiments, the electronic component (e.g., 670) determines that the package has been tampered with when the electronic component (e.g., 670) detects that a wire loop (e.g., a resistive wire loop and/or a capacitive wire loop) (e.g., 672) of the electronic component (e.g., 670) is broken (e.g., not intact and/or an open circuit). In some embodiments, the electronic component (e.g., 670) determines that the package has been tampered with when the electronic component (e.g., 670) detects that one or more electrical properties of a wire loop (e.g., a resistive wire loop and/or a capacitive wire loop) (e.g., 672) of the electronic component (e.g., 670) are outside of a defined range and/or have been altered from a known state (e.g., not intact and/or an open circuit). In some embodiments, the one or more electrical properties of the wire loop include a resistance of the wire loop and/or a capacitance of the wire loop.

In some embodiments, the computer system (e.g., server 554 and/or 600) determines, using the information (e.g., as part of a challenge-response process) whether the package (e.g., 660) (e.g., the packaging (e.g., the box and/or the envelope) of the package, the physical account card that is part of the package, and/or the electronic component) has been tampered with.

In some embodiments, in accordance with (and, optionally, based on and/or in response to receiving the request to associate the one or more resources with the physical account card) the determination that the set of one or more conditions is met, the computer system (e.g., server 554 and/or 600) transmits (e.g., to a mobile device and/or a POS terminal) an indication (e.g., 602B) that the package (e.g., 660) has not been tampered with; and in accordance with (and, optionally, based on and/or in response to receiving the request to associate the one or more resources with the physical account card) the determination that the set of one or more conditions is not met (e.g., the information does not indicate the package has not been tampered with and/or indicates that the package has been tampered with), the computer system (e.g., server 554 and/or 600) transmits an indication (e.g., 602C) that the package (e.g., 660) has been tampered with without transmitting the indication that the package (e.g., 660) has not been tampered with.

Note that details of the processes described above with respect to method 700 (e.g., FIG. 7) are also applicable in an analogous manner to the methods described below. For example, method 700 optionally includes one or more of the characteristics of the various methods described below with reference to method 900. For example, the physical account card is the same physical account card in both processes. For another example, the one or more resources associated with the physical account card in method 700 are the same one or more resources being requested and/or accessed in method 900. For brevity, these details are not repeated below.

FIGS. 8A-8D illustrate exemplary user interfaces and techniques for accessing one or more resources associated with a physical account card, in accordance with some embodiments. The user interfaces in these figures are used to illustrate the processes described below, including the processes in FIG. 9.

At FIG. 8A, computer system 600 is placed within communication range of electronic component 670 (e.g., after electronic component 670 has been associated with the one or more resources, as described above with respect to FIGS. 6A-6B). While within communication range (e.g., NFC communication range) of electronic component 670, computer system 600 transmits (e.g., via an NFC interface of computer system 600) a challenge to electronic component 670 and, subsequently (e.g., in response), receives a response to the challenge from electronic component 670 as part of a challenge-response communication. In some embodiments, computer system 600 powers electronic component 670 during all or part of the challenge-response communication. In some embodiments, computer system 600 generates the challenge before transmitting the challenge to electronic component 670. In some embodiments, computer system 600 receives the challenge from a server, such as server 554, or bases the challenge on data received from server 554. At FIG. 8A, computer system 600 displays, via display 602, indication 602D that computer system 600 is reading information from electronic component 670.

At FIG. 8B, computer system 600 displays user interface 802A, including first ("yes") option 802B and second ("no") option 802C, for transferring one or more resources associated with physical account card 640 to an account of the user of computer system 600. Computer system 600 detects input 850A directed to first option 802B and, in response, transmits a request (e.g., to server 554) for transferring the one or more resources to an account of the user. Computer system 600 also transmits (e.g., to server 554) the information received from electronic component 670 to enable server 554 to determine whether package 660 has been tampered with or not. Server 554 uses the challenge and the information (response) to determine whether package 660 has been tampered with.

In some embodiments, at FIG. 8C, server 554 has determined that package 660 has not been tampered with and has completed the transfer of the one or more resources (e.g., access to a building or location when physical account card 640 is an access badge and/or funds (e.g., $20, $100, or $200) when physical account card 640 is a gift card) to an account of the user of computer system 600. Computer system 600 receives an indication that the transfer is complete and, in response, displays indication 802D that the transfer is complete.

In some embodiments, at FIG. 8D, server 554 has determined that package 660 has been tampered with (e.g., based on the challenge-response not authenticating electronic component 670 because wire loop 672 is not intact) and has not completed the transfer of the one or more resources to an account of the user of computer system 600. Computer system 600 receives an indication that the transfer has been denied and, in response, displays indication 802E that the transfer has been denied.

In some embodiments, electronic component 670 is attached to physical account card 640 and electronic component 670 determines whether physical account card 640 has been tampered with. In some embodiments, electronic component 670 provides the identifier for physical account card 640.

Accordingly, computer system 600 can work with server 554 to confirm the security and authenticity of package 660 and, accordingly, of physical account card 640 before transferring resources associated with the physical account card to an account of the user of computer system 600.

FIG. 9 is a flow diagram illustrating methods of accessing one or more resources associated with a physical account card, in accordance with some embodiments Method 900 is performed at a computer system (e.g., 100, 300, 500, and/or 600) (e.g., a smartphone, a smartwatch, a tablet computer, a laptop computer, a desktop computer, and/or a head mounted device (e.g., a head mounted augmented reality and/or extended reality device)) that is in communication with (e.g., that includes, and/or that is in wireless and/or wired communication with) a display generation component (e.g., 602) (e.g., a display controller, a display, a touch-sensitive display system, a touchscreen, a monitor, and/or a head mounted display system), a short-range communication radio, and a communication interface (e.g., a wireless network interface, WIFI, a cellular interface, ethernet, and/or USB) that is different from the short-range communication radio. Some operations in method 900 are, optionally, combined, the orders of some operations are, optionally, changed, and some operations are, optionally, omitted.

As described below, method 900 provides an intuitive way for accessing one or more resources associated with a physical account card. The method improves the security of the process and reduces the cognitive burden on a user for accessing one or more resources associated with a physical account card, thereby creating a more efficient human-machine interface. For battery-operated computing devices, enabling a user to use the one or more resources faster and more efficiently conserves power and increases the time between battery charges.

The computer system (e.g., 600) receives (902) (e.g., directly and/or wirelessly), via the short-range communication radio, information from an electronic component (e.g., 670) (e.g., an NFC chip, an RFID chip, and/or a passive close-range communication circuit) that is part of (e.g., included in, attached to, and/or embedded into) (e.g., part of the packaging of the package and/or part of the physical account card that is inside the package) a package (e.g., 660) (e.g., a physical account card package, an envelope, a wrapping, and/or a box) that includes a physical account card (e.g., 640) (e.g., a security badge, an identification card, and/or a gift card) (e.g., that is the same or similar size as a credit card and/or is made using plastic), wherein one or more resources (e.g., building access, room access, and/or funds) are associated (e.g., were previously associate with the card at a server and/or by a service) with (e.g., corresponding to and/or assigned to) the physical account card (e.g., 640).

While logged into an account (e.g., a user account and/or a device account) of a service (e.g., a building access management service, a banking service, a cloud service, and/or an account management service), the computer system (e.g., 600) transmits (904) to an external device (e.g., 554) (e.g., to a server, to a badge reader, to a proximity card reader, to a handheld mobile device (e.g., a phone and/or a tablet), to a card reader, and/or to a point-of-sale terminal), via the communication interface that is different from the short-range communication radio: a request (906) to associate (e.g., correspond and/or move) the one or more resources (e.g., building access, room access, and/or funds) with the account of the service (e.g., associate the one or more resources of the card with the user account and/or move the one or more resources to the user account) and the information (908) received from the electronic component (e.g., 670). In some embodiments, the information received from the electronic component is transmitted as part of the request to associate the one or more resources with the account. In some embodiments, the information provided by the electronic component is transmitted separately (before or after) from the request to associate the one or more resources with the account.

Subsequent to transmitting the request to associate the one or more resources associated with the physical account card (e.g., 640) with the account, the computer system (e.g., 600) receives (910) (e.g., from the external device and/or a different device) a response (e.g., that is based on the request and/or based on the information received from the electronic component), wherein the response includes an indication, determined (e.g., by the computer system, the server, and/or the service) using the information received from the electronic component (e.g., 670), of whether the package (e.g., 660) (e.g., the packaging (e.g., the box and/or the envelope) of the package, the physical account card that is part of the package, and/or the electronic component) has been tampered with. In some embodiments, the electronic component (e.g., 670) detects tampering of the physical account card (e.g., 640) and the indication in the response is based on whether the electronic device (e.g., 670) detected that the physical account card (e.g., 640) was tampered with.

In accordance with (and, optionally, in response to receiving the response) a determination that the response indicates that the package (e.g., 660) (e.g., the packaging (e.g., the box and/or the envelope) of the package, the physical account card that is part of the package, and/or the electronic component) has not been tampered with (e.g., has not been improperly accessed, has not been opened, has not been modified, and/or has not been removed and replaced), the computer system (e.g., 600) displays (912), via the display generation component (e.g., 602), a first indication (e.g., 802D) (e.g., that the package has not been tampered with, that the one or more resources are available to associate with the account, and/or that the one or more resources have been associated with the account) (and, optionally, without displaying a second indication).

In accordance with (and, optionally, in response to receiving the response) a determination that the response indicates that the package (e.g., 660) (e.g., the packaging (e.g., the box and/or the envelope) of the package, the physical account card that is part of the package, and/or the electronic component) has been tampered with (e.g., has been improperly accessed, has been opened, has been modified, and/or has been removed and replaced), the computer system (e.g., 600) displays (914), via the display generation component (e.g., 602), a second indication (e.g., 802E) (e.g., that the package has not been tampered with, that the one or more resources are available to associate with the account, and/or that the one or more resources have been associated with the account) that is different from the first indication (and, optionally, without displaying the first indication).

In some embodiments, the physical account card (e.g., 640) is a building access card. In some embodiments, when the building access card is active, a building access reader (e.g., a badge reader) accesses information on the physical account card to determine whether the building access card has access to a particular location (e.g., building and/or room).

In some embodiments, the physical account card (e.g., 640) is a gift card. In some embodiments, the one or more resources are funds that are to be associated with the gift card. Once the funds are associated with the gift card, an owner of the funded gift card can transfer and/or associate those funds with the owner's user account, thereby accessing the funds for use to make purchases.

In some embodiments, the electronic component (e.g., 670) (e.g., an NFC chip, an RFID chip, and/or a passive close-range communication circuit) is part of (e.g., included in, attached to, and/or embedded into) packaging (e.g., box, envelope, and/or wrap) of the package (e.g., 660) (e.g., a physical account card package, an envelope, a wrapping, and/or a box) and the electronic component (e.g., 670) is not part of the physical account card (e.g., 640). In some embodiments, the physical account card includes a second (separate) electronic component (e.g., an NFC chip, an RFID chip, and/or a passive close-range communication circuit) that is different from the electronic component.

In some embodiments, the information is part of a response of a challenge-response process. In some embodiments, a challenge-response process is a process during which the electronic component is presented (e.g., by the computer system, by a server, and/or point-of-sale terminal) with a challenge and the electronic component uses the challenge to provide a valid response to be authenticated (and include response to not be authenticated). In some embodiments, the information is the response of the challenge-response process.

In some embodiments, the computer system (e.g., 600) receives (e.g., via the communication interface) a challenge (e.g., from a server and/or from the service) from the external device (e.g., server 554) and, subsequent to receiving the challenge, the computer system (e.g., 600) transmits, via the short-range communication radio, the challenge to the electronic component (e.g., 670). In some embodiments, the electronic component uses the challenge to generate the response as part of the challenge-response process.

In some embodiments, the computer system (e.g., 600) generates a challenge (e.g., without receiving the challenge from the external device, a server, and/or from the service) and, subsequent to generating the challenge, the computer system (e.g., 600) transmits, via the short-range communication radio, the challenge to the electronic component (e.g., 670). In some embodiments, the electronic component uses the challenge to generate the response as part of the challenge-response process.

In some embodiments, subsequent to generating the challenge, the computer system (e.g., 600) transmits, via the communication interface, the challenge to the external device (e.g., server 554). In some embodiments, the external device uses the challenge (and the response contained in the information) to authenticate the electronic component as part of the challenge-response process.

In some embodiments, the electronic component (e.g., 670) determines whether the package (e.g., 660) (e.g., the packaging (e.g., the box and/or the envelope) of the package, the physical account card that is part of the package, and/or the electronic component) has been tampered with based on a status of physical surroundings of the electronic component (e.g., 670) (e.g., based on a capacitance, based on a resistance, and/or based on the packaging having been opened). In some embodiments, the status of the physical surroundings is determined using a resistance wire, a wire loop, and/or capacitive sensing (e.g., sensing the peeling of a label).

In some embodiments, the electronic component (e.g., 670) determines that the package (e.g., 660) has been tampered with when the electronic component (e.g., 670) detects that the physical account card (e.g., 640) and/or packaging of the package (e.g., 660) have been tampered with.

In some embodiments, the electronic component (e.g., 670) determines that the package (e.g., 660) has been tampered with when the electronic component (e.g., 670) detects that the electronic component (e.g., 670) has been removed from the package (e.g., 660) and/or the physical account card (e.g., 640) (e.g., based on at least a portion of the circuitry of the electronic component being disconnected from and/or shorted to another portion of the electronic component).

In some embodiments, the electronic component (e.g., 670) determines that the package (e.g., 660) has been tampered with when the electronic component (e.g., 670) detects that a wire loop (e.g., a resistive wire loop and/or a capacitive wire loop) of the electronic component (e.g., 670) is broken (e.g., not intact and/or an open circuit). In some embodiments, the electronic component (e.g., 670) determines that the package has been tampered with when the electronic component (e.g., 670) detects that one or more electrical properties of a wire loop (e.g., a resistive wire loop and/or a capacitive wire loop) (e.g., 672) of the electronic component (e.g., 670) are outside of a defined range and/or have been altered from a known state (e.g., not intact and/or an open circuit). In some embodiments, the one or more electrical properties of the wire loop include a resistance of the wire loop and/or a capacitance of the wire loop.

In some embodiments, the computer system (e.g., 600) receives, via one or more input devices, input (e.g., user input, touch input, and/or voice input) selecting the account and the computer system (e.g., 600) transmits, to an external device (e.g., server 554), an indication of the account as part of the request.

Note that details of the processes described above with respect to method 900 (e.g., FIG. 9) are also applicable in an analogous manner to the methods described above. For example, method 900 optionally includes one or more of the characteristics of the various methods described above with reference to method 700. For example, the physical account card is the same physical account card in both processes. For another example, the one or more resources associated with the physical account card in method 700 are the same one or more resources being requested and/or accessed in method 900. For another example, in some embodiments, the external device of method 900 is the computer system of method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the security of physical account cards and/or resources. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide additional security measures. Accordingly, use of such personal information data enables users to have calculated control of resources. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of associating or accessing resources corresponding to a physical account card, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, resources can be managed based on non-personal information data or a bare minimum amount of personal information, such as the content being requested by the device associated with a user, other non-personal information that is available.

What is claimed is:

1. A computer system that is configured to communicate with a display generation component, a short-range communication radio, and a communication interface that is different from the short-range communication radio, comprising:

one or more processors; and memory storing one or more programs configured to be executed by the one or more processors, the one or more programs including instructions for:

receiving, via the short-range communication radio, information from an electronic component that is part of a package that includes a physical account card, wherein one or more resources are associated with the physical account card;

while logged into an account of a service, transmitting to an external device, via the communication interface that is different from the short-range communication radio:

a request to associate the one or more resources with the account of the service; and the information received from the electronic component;

subsequent to transmitting the request to associate the one or more resources associated with the physical account card with the account, receiving a response, wherein the response includes an indication, determined using the information received from the electronic component, of whether the package has been tampered with, and wherein the electronic component determines whether the package has been tampered with based on a status of physical surroundings of the electronic component;

in accordance with a determination that the response indicates that the package has not been tampered with, displaying, via the display generation component, a first indication; and in accordance with a determination that the response indicates that the package has been tampered with, displaying, via the display generation component, a second indication that is different from the first indication.

2. The computer system of claim 1, wherein the physical account card is a building access card.

3. The computer system of claim 1, wherein the physical account card is a gift card.

4. The computer system of claim 1, wherein the electronic component is part of packaging of the package and the electronic component is not part of the physical account card.

5. The computer system of claim 1, wherein the information is part of a response of a challenge-response process.

6. The computer system of claim 1, the one or more programs further including instructions for:

receiving a challenge from the external device; and subsequent to receiving the challenge, transmitting, via the short-range communication radio, the challenge to the electronic component.

7. The computer system of claim 1, the one or more programs further including instructions for:

generating a challenge; and subsequent to generating the challenge, transmitting, via the short-range communication radio, the challenge to the electronic component.

8. The computer system of claim 7, the one or more programs further including instructions for:

subsequent to generating the challenge, transmitting, via the communication interface, the challenge to the external device.

9. The computer system of claim 1, wherein the electronic component determines that the package has been tampered with when the electronic component detects that the physical account card and/or packaging of the package have been tampered with.

10. The computer system of claim 1, wherein the electronic component determines that the package has been tampered with when the electronic component detects that the electronic component has been removed from the package and/or the physical account card.

11. The computer system of claim 1, wherein the electronic component determines that the package has been tampered with when the electronic component detects that a wire loop of the electronic component is broken.

12. The computer system of claim 1, the one or more programs further including instructions for:

receiving, via one or more input devices, input selecting the account; and transmitting, to an external device, an indication of the account as part of the request.

13. A non-transitory computer-readable storage medium storing one or more programs configured to be executed by one or more processors of a computer system that is in communication with a display generation component, a short-range communication radio, and a communication interface that is different from the short-range communication radio, the one or more programs including instructions for:

receiving, via the short-range communication radio, information from an electronic component that is part of a package that includes a physical account card, wherein one or more resources are associated with the physical account card;

while logged into an account of a service, transmitting to an external device, via the communication interface that is different from the short-range communication radio:

a request to associate the one or more resources with the account of the service; and the information received from the electronic component;

subsequent to transmitting the request to associate the one or more resources associated with the physical account card with the account, receiving a response, wherein the response includes an indication, determined using the information received from the electronic component, of whether the package has been tampered with, and wherein the electronic component determines whether the package has been tampered with based on a status of physical surroundings of the electronic component;

in accordance with a determination that the response indicates that the package has not been tampered with, displaying, via the display generation component, a first indication; and in accordance with a determination that the response indicates that the package has been tampered with, displaying, via the display generation component, a second indication that is different from the first indication.

14. A method, comprising:

at a computer system that is in communication with a display generation component, a short-range communication radio, and a communication interface that is different from the short-range communication radio:

receiving, via the short-range communication radio, information from an electronic component that is part of a package that includes a physical account card, wherein one or more resources are associated with the physical account card;

while logged into an account of a service, transmitting to an external device, via the communication interface that is different from the short-range communication radio:

a request to associate the one or more resources with the account of the service; and the information received from the electronic component;

57 subsequent to transmitting the request to associate the one or more resources associated with the physical account card with the account, receiving a response, wherein the response includes an indication, determined using the information received from the electronic component, of whether the package has been tampered with, and wherein the electronic component determines whether the package has been tampered with based on a status of physical surroundings of the electronic component;

in accordance with a determination that the response indicates that the package has not been tampered with, displaying, via the display generation component, a first indication; and in accordance with a determination that the response indicates that the package has been tampered with, displaying, via the display generation component, a second indication that is different from the first indication.

15. The non-transitory computer-readable storage medium of claim 13, wherein the physical account card is a building access card.

16. The non-transitory computer-readable storage medium of claim 13, wherein the physical account card is a gift card.

17. The non-transitory computer-readable storage medium of claim 13, wherein the electronic component is part of packaging of the package and the electronic component is not part of the physical account card.

18. The non-transitory computer-readable storage medium of claim 13, wherein the information is part of a response of a challenge-response process.

19. The non-transitory computer-readable storage medium of claim 13, the one or more programs further including instructions for:

receiving a challenge from the external device; and subsequent to receiving the challenge, transmitting, via the short-range communication radio, the challenge to the electronic component.

20. The non-transitory computer-readable storage medium of claim 13, the one or more programs further including instructions for:

generating a challenge; and subsequent to generating the challenge, transmitting, via the short-range communication radio, the challenge to the electronic component.

21. The non-transitory computer-readable storage medium of claim 20, the one or more programs further including instructions for:

subsequent to generating the challenge, transmitting, via the communication interface, the challenge to the external device.

22. The non-transitory computer-readable storage medium of claim 13, wherein the electronic component determines that the package has been tampered with when the electronic component detects that the physical account card and/or packaging of the package have been tampered with.

23. The non-transitory computer-readable storage medium of claim 13, wherein the electronic component determines that the package has been tampered with when the electronic component detects that the electronic component has been removed from the package and/or the physical account card.

24. The non-transitory computer-readable storage medium of claim 13, wherein the electronic component determines that the package has been tampered with when the electronic component detects that a wire loop of the electronic component is broken.

25. The non-transitory computer-readable storage medium of claim 13, the one or more programs further including instructions for:

receiving, via one or more input devices, input selecting the account; and transmitting, to an external device, an indication of the account as part of the request.

26. The method of claim 14, wherein the physical account card is a building access card.

27. The method of claim 14, wherein the physical account card is a gift card.

28. The method of claim 14, wherein the electronic component is part of packaging of the package and the electronic component is not part of the physical account card.

29. The method of claim 14, wherein the information is part of a response of a challenge-response process.

30. The method of claim 14, further comprising:

receiving a challenge from the external device; and subsequent to receiving the challenge, transmitting, via the short-range communication radio, the challenge to the electronic component.

31. The method of claim 14, further comprising:

generating a challenge; and subsequent to generating the challenge, transmitting, via the short-range communication radio, the challenge to the electronic component.

32. The method of claim 31, further comprising:

subsequent to generating the challenge, transmitting, via the communication interface, the challenge to the external device.

33. The method of claim 14, wherein the electronic component determines that the package has been tampered with when the electronic component detects that the physical account card and/or packaging of the package have been tampered with.

34. The method of claim 14, wherein the electronic component determines that the package has been tampered with when the electronic component detects that the electronic component has been removed from the package and/or the physical account card.

35. The method of claim 14, wherein the electronic component determines that the package has been tampered with when the electronic component detects that a wire loop of the electronic component is broken.

36. The method of claim 14, further comprising:

receiving, via one or more input devices, input selecting the account; and transmitting, to an external device, an indication of the account as part of the request.

* * * * *